US012711097B2

(12) United States Patent
Murali et al.

(10) Patent No.: US 12,711,097 B2
(45) Date of Patent: Aug. 18, 2026

(54) BIG DATA RETENTION MANAGEMENT SYSTEM

(71) Applicant: Roku, Inc., San Jose, CA (US)

(72) Inventors: Bharathkrishna Guruvayoor Murali, San Jose, CA (US); Abhilash Mittapalli, Fremont, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 19/057,547

(22) Filed: Feb. 19, 2025

(65) Prior Publication Data

US 2026/0086979 A1 Mar. 26, 2026

Related U.S. Application Data

(60) Provisional application No. 63/697,276, filed on Sep. 20, 2024.

(51) Int. Cl.
*G06F 16/11* (2019.01)
*G06F 16/14* (2019.01)
*G06F 16/27* (2019.01)

(52) U.S. Cl.
CPC ............ *G06F 16/125* (2019.01); *G06F 16/14* (2019.01); *G06F 16/278* (2019.01)

(58) Field of Classification Search
CPC ....... G06F 16/125; G06F 16/14; G06F 16/278
See application file for complete search history.

(56) References Cited

U.S. PATENT DOCUMENTS

| | | | | |
|---|---|---|---|---|
| 9,934,256 | B2 * | 4/2018 | Hu | G06F 16/21 |
| 12,072,868 | B1 * | 8/2024 | Opincariu | G06F 16/2379 |
| 2021/0034598 | A1 * | 2/2021 | Arye | G06F 16/288 |
| 2024/0028766 | A1 * | 1/2024 | McLachlan | G06F 21/6254 |
| 2024/0427754 | A1 * | 12/2024 | Sen | G06F 16/125 |

* cited by examiner

*Primary Examiner* — Hares Jami
(74) *Attorney, Agent, or Firm* — Akona IP PC

(57) ABSTRACT

A cost effective big data retention management system can be implemented. The system may include a retention tagging system, which allows metastore tables managed by a query engine to be tagged with a retention policy. The system may include a partition semantics system, which can understand the retention tags and produce retention events. The system may include an event consumption system, which can process the retention events and execute a set of operations for the retention events. The system may include a data restoration system, which allows archived data to be restored as needed. The system may include a listener, which can enforce one or more rules relating to retention-related table properties.

20 Claims, 11 Drawing Sheets

| RetentionEvents | |
|---|---|
| id | bigint |
| db_name | VARCHAR(255) |
| table_name | VARCHAR(255) |
| partition_name | mediumtext |
| operation_type | ENUM('ARCHIVE', 'DELETE', 'RESTORE_EXPIRY') |
| retention_period | int |
| status | ENUM('TO_BE_PROCESSED', 'IN_PROCESSING', 'RETRY', 'FAILED', 'FINISHED') |
| retry_count | int |
| update_timestamp | TIMESTAMP |
| table_category | VARCHAR(255) |
| restore_request_id | bigint |
| status_message | mediumtext |
| transfer_job_ids | mediumtext |

FIG. 4

| RestoreRequests | |
| --- | --- |
| id | bigint |
| db_name | VARCHAR(255) |
| table_name | VARCHAR(255) |
| start_date | VARCHAR(255) |
| end_date | VARCHAR(255) |
| insert_time | timestamp |
| expiry_days | int |
| status | ENUM('ACTIVE', 'EXPIRED') |

FIG. 5

BIG DATA RETENTION MANAGEMENT SYSTEM

CROSS-REFERENCE TO RELATED APPLICATIONS

This application is a U.S. non-provisional application that claims priority to and/or receives benefit from U.S. provisional application No. 63/697,276, titled "BIG DATA RETENTION MANAGEMENT SYSTEM", filed on Sep. 20, 2024. The U.S. provisional application is hereby incorporated by reference in its entirety.

TECHNICAL FIELD

This disclosure relates generally to big data systems, and more specifically, to big data retention management systems.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 4 depicts data fields for a retention event, according to some embodiments of the disclosure.

FIG. 5 depicts data fields for a restore request, according to some embodiments of the disclosure.

DETAILED DESCRIPTION

Overview

Big data refers to extremely large and complex data sets. The sheer amount of big data generated, collected, and stored can have a volume of terabytes or petabytes. The data can have diverse types of data, including structured, semi-structured, and unstructured data. For a device design and manufacturing company, big data include device activity logs and user interactivity logs. During the usage of an electronic device or software platform, events and/or user inputs/outputs occurring the electronic device or software platform can often be timestamped and logged.

Big data can allow for historical analysis and trend identification. Companies can use big data for long-term pattern recognition and comparison of current data with historical data. Big data can be used for predictive analytics and forecasting. In some situations, big data can offer business intelligence and enable better decision making. Sometimes, big data can be used for understanding long-term user behavior, enable personalized marketing and service offerings, and support customer lifetime value calculations. In research and development, big data can be generated during experiments or A/B user testing. More recently, big data can be used in machine learning and training. Big data can be used as large, diverse data sets for training machine learning models.

In the realm of big data, storage costs are a significant contributor to infrastructure costs, accounting for 15-20% of the total infrastructure costs. Optimizing these costs and making more efficient use of infrastructure are two technical challenges that engineers face when managing and maintaining big data systems. If the data isn't being used or accessed frequently, or if there is no present need to access the data, it may be preferable to store the data in cheaper storage locations or move the data from more expensive storage locations to cheaper storage locations. In some cases, if the data is no longer needed or regulations require the data to not be retained, it may be preferable to have the data deleted or removed all together. In some cases, data that has been archived needs to be restored. Organizing and maintaining large data sets, including implementing data retention policies and data lifecycle policies, can be complex and non-trivial.

Figure 1:
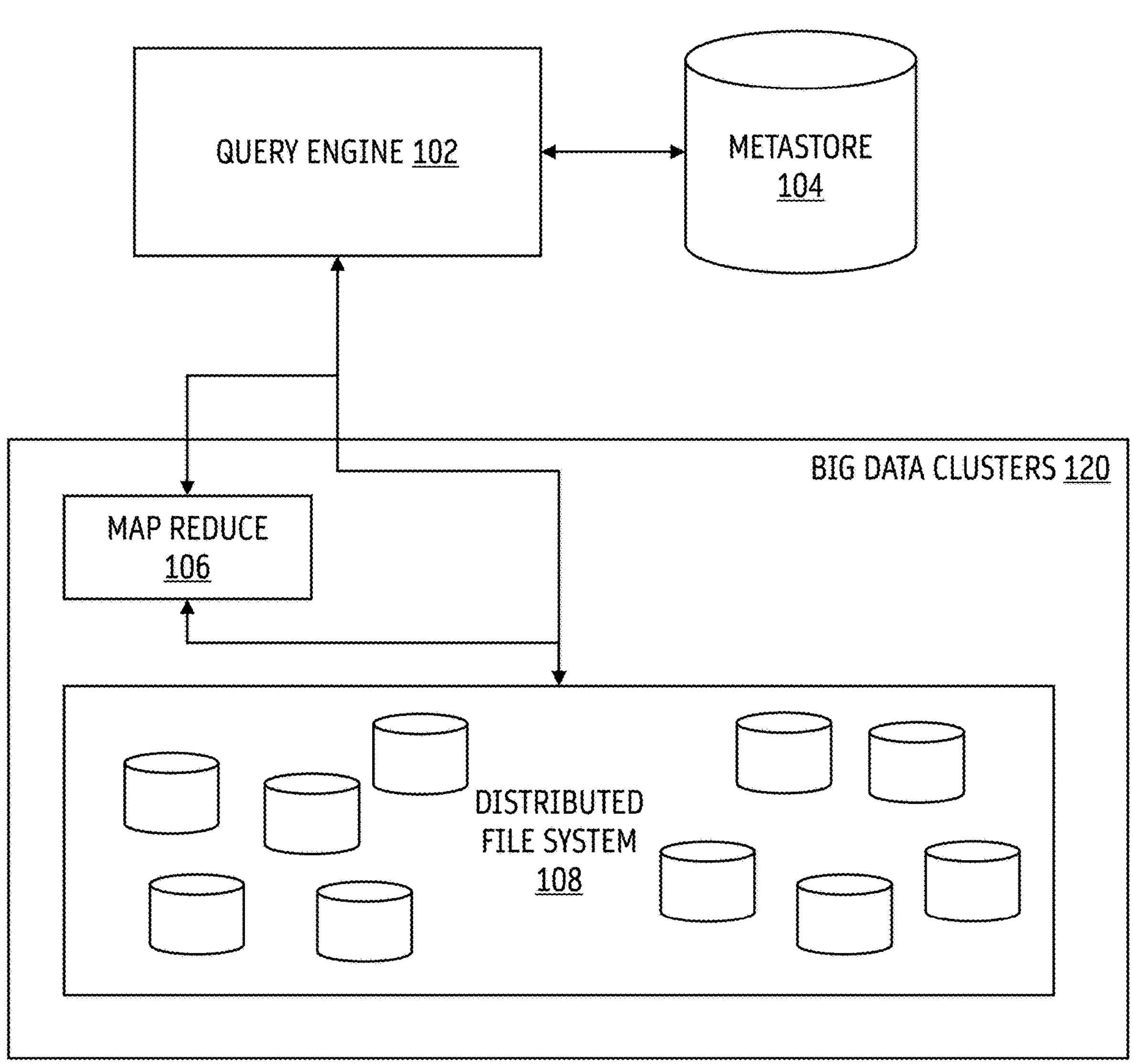
FIG. 1 illustrates a big data system, according to some embodiments of the disclosure.

In an open source big data environment, the majority of data—both raw and processed—is stored in object stores like Amazon S3 or Google Cloud Platform (GCP). Apache Hadoop is an example of an open source software framework that is designed to store and process big data in a distributed computing environment. To make it possible to query the object stores, Apache Hive (or similar query engines or metadata management solution) have been introduced to map big data in object stores to queryable tables. FIG. 1 illustrates a big data system that includes a query engine and big data clusters using these frameworks.

However, not all big data is accessed equally. More recent data is typically accessed more frequently, and object stores offer different storage tiers (e.g., STANDARD, NEARLINE, COLDLINE) with varying costs. Storage tier transition rules can be defined based on last-access time or last-modified time. While these tiers help manage storage costs, existing solutions like GCP auto-class or S3 Intelligent-Tiering (S3-INT) Storage Class are limited to optimizing storage within a single cloud region (e.g., US-east1). This limitation forces users to keep both the most recent (hottest) and least recent (coldest) data in the same region, restricting cost optimization (this limitation prevents realization of cost savings from being able to choose a different region for archive storage). In addition, the platforms impose waiting periods for moving data between storage tiers, which can prevent cutting down archive restore costs. For instance, data that is in archive storage when accessed is put back in standard storage. A user has to wait at least 365 days before moving the data back to archive storage.

Some data retention solutions may implement last-modified time-based rules to manage data lifecycle. The last-modified time may be based on the last-modified time of an object in the object store, or a partition add time in a query engine (e.g., Apache Hive). The solutions. Cloud providers like Amazon S3 and GCP provide a way of adding these rules. However, using the last-modified time as a basis for data retention can be prone to issues with user backfills interfering with data archive and data staying longer than anticipated in non-archive storage. In some scenarios, last-modified time is not the appropriate basis for defining a data retention policy, or for judging data recency (e.g., how long has it been since the data was generated or created). User backfills refers to the process of retroactively processing or reprocessing data to fill gaps, correct errors, or update data based on new logic or requirements. Backfills can update the last-modified time or partition add time, leading to inaccurate real data recency tracking. Data archive refers to archiving data from non-archive (more expensive, potentially faster) storage to archive storage (less expensive, potentially slower).

Figure 3:
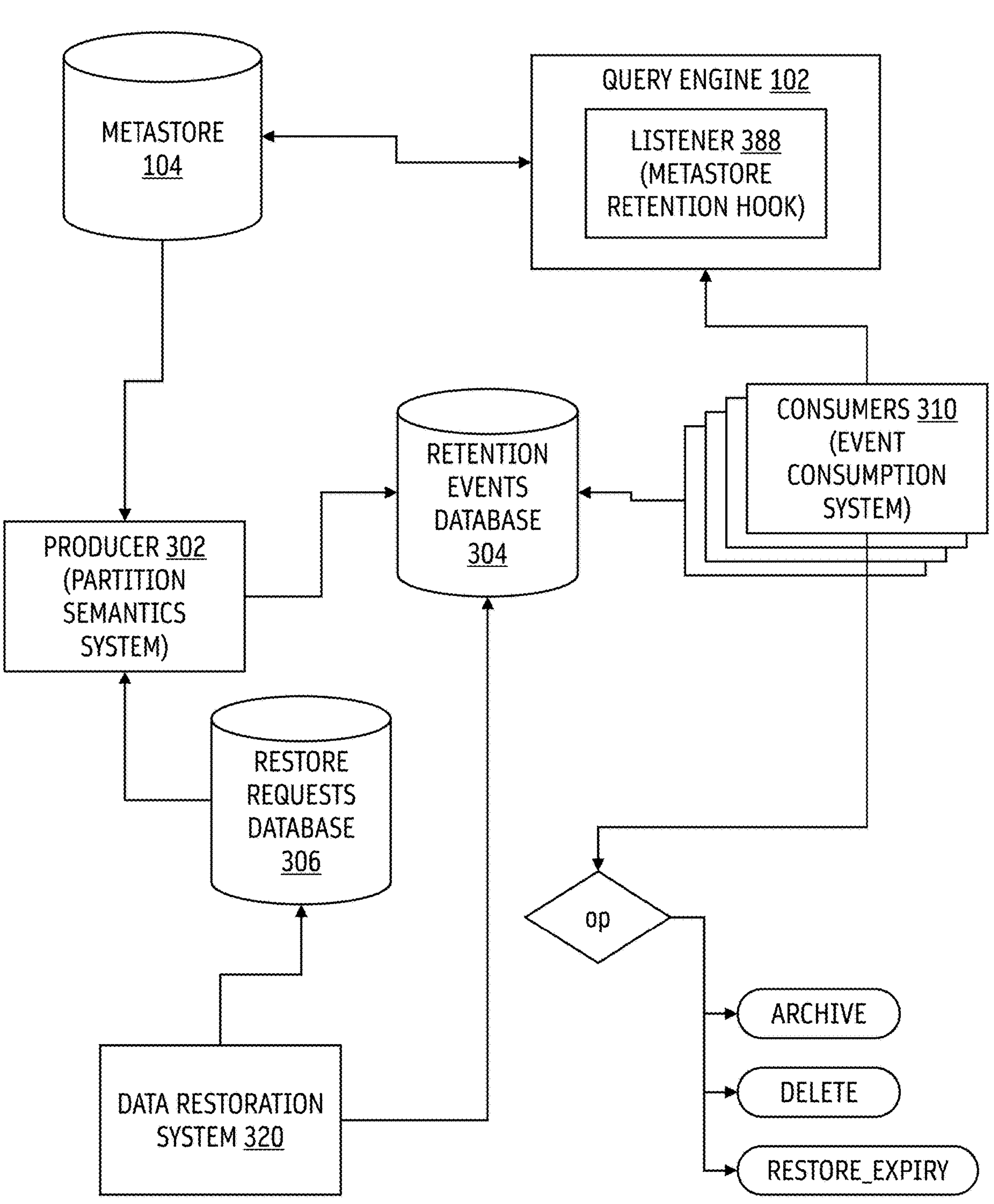
FIG. 3 illustrates a big data retention management system, according to some embodiments of the disclosure.

To address some of these concerns, a cost effective big data retention management system can be implemented. The system is illustrated in FIG. 3. The system may include a retention tagging system, which allows metastore tables managed by a query engine to be tagged with a retention policy. The system may include a partition semantics system (also referred to as a producer), which can understand the retention tags and produce retention events. The system may include an event consumption system (also referred to as consumers), which can process the retention events and execute a set of operations for the retention events. The system may include a data restoration system, which allows archived data to be restored as needed. The system may include a listener, which can enforce one or more rules relating to retention-related table properties.

The partition semantics system can parse a metastore table to extract a table property (the table property being a retention tag). The metastore table can be organized based on a date/time partition key and thus has one or more time-related partitions. The table property can refer to or correspond to a retention policy having a retention action and a retention period. Retention action can be an archive action or a delete action. A retention period can specify a time period for retaining a partition. In response to determining that the first retention period applies to a time-related partition of the metastore table, the time-related partition, in particular, the value of the date/time partition key (representing true data recency), is evaluated against the retention period specified by the retention policy. The evaluation against the retention period can determine whether the time-related partition is out-of-retention. In response to determining that the time-related partition is out-of-retention, the partition semantics system can create a retention event specifying the time-related partition and the retention action specified by the retention policy. The retention event is stored in a retention events database, which can be processed by the event consumption system. Creation of a retention event is blocked if there is an active restore request for that time-related partition.

In some embodiments, a more fine-grained approach to retention can be implemented to apply different retention periods to different parts of a metastore table. A retention tag, or a table property, can be included in a table definition to specify one or more filter criteria and corresponding retention period overrides to apply to a time-related partition that matches a given filter criteria. The retention period is still applied to the date partition key-values of the data objects (the true time of creation of the data objects), but different retention periods can be applied to different parts of the metastore table that meet different filter criteria.

Big Data Ecosystem and Infrastructure

FIG. 1 illustrates a big data system, according to some embodiments of the disclosure. The big data system may include big data clusters 120, which can include map reduce 106 and distributed file system 108. Big data clusters 120 can be managed using a software framework, such as the open source framework called Apache Hadoop. Big data can be stored in distributed file system 108, and map reduce 106 can be used to manipulate the big data stored in distributed file system 108.

Distributed file system 108 may offer high-throughput access to big data. Distributed file system 108 may split files into large blocks and distribute them across nodes in a cluster. Distributed file system 108 may manage storage and/or duplication of data across clusters, such as clusters in different regions. Distributed file system 108 may ensure reliable, scalable data storage across many nodes (typically implemented on commodity servers).

Map reduce 106 may implement a programming model for processing and generating large data sets. Map reduce is sometimes called MapReduce. Map reduce 106 may implement a map( ) procedure for filtering and sorting. Map reduce 106 may implement a reduce( ) procedure for summary operations. Map reduce 106 can be cumbersome to work with and requires Java knowledge to perform map( ) and reduce( ) procedures. Alternative systems to map reduce 106 have been used, including Apache Spark.

Query engine 102 has been introduced to facilitate using map reduce 106 to work with data in distributed file system 108 of big data clusters 120. An example of query engine 102 is the open source software platform called Apache Hive. Query engine 102 can offer data query and analysis capabilities with a structured query language (SQL) interface. SQL users can write MapReduce jobs to be executed by map reduce 106 without needing to know Java. Query engine 102 can be scalable and can handle very large datasets stored in distributed file system 108. Query engine 102 can enable complex queries on large data sets for generating data summarization and analysis reports. Query engine 102 can process and transform raw data into a more structured format using extract, transform, and load operations. Query engine 102 can support batch processing. Query engine 102 can support parallel processing across multiple nodes in distributed file system 108.

Query engine 102 uses a (remote or local) metastore 104 to store metastore tables. Query engine 102 relies on metastore 104 to store metadata about tables, partitions, and other schema-related information. Metastore 104 maintains a catalog of metadata about the big data objects in distributed file system 108. The metadata can include, tables, partitions of the tables, table columns and their types, table locations, serialization and deserialization (SERDES) information, and properties of the tables. Metastore 104 may store the metadata as tables in a relational database for quick access and management. There can be thousands of tables in metastore 104.

A metastore table in metastore 104 can include columns with defined data types. Properties associated with a metastore table can include one or more of: table name, column names, column data types, storage format, location in distributed file system 108, SERDES information, and table properties.

A metastore table can be partitioned, meaning that a metastore table can be divided into smaller parts based on one or more columns. Partitioning can improve query performance by allowing query engine 102 to skip irrelevant data. Partitioning can enable more efficient data management and organization. Partitioning can allow partitions to be dropped easily for data lifecycle management purposes. Each partition of a table can be viewed as having metadata for a subdirectory in the table's location in distributed file system 108. A partition may have associated metadata, including partition keys (columns used for partitioning), partition values, and location of the partition. Partition keys are columns used to divide the data into partitions. Partition keys can determine how the data is organized and distributed. Partition keys can be chosen based on frequently used query filters, such as date, region, category, etc. An example set of partition keys may include year, month, and country.

A metastore table can have multiple partition keys for diverse and different levels of granularity. Partition values are specific values for each partition key that define the particular partition. Each unique combination of partition key-value pair creates a separate partition. A partition value can include a single value or a range of values. A partition value can be determined dynamically from data or can be pre-defined. An example set of partition values may include year='2024', month='09', and country='US'. A location of a partition corresponds to a subdirectory in distributed file system 108. Directories can be named using "key=value" format. The hierarchy can match the order of partition keys defined in the table schema when a metastore table is created. A full path to the location can combine the location of the metastore table with partition subdirectories. An example of the full path may be:

```
/user/query__engine/warehouse/abtest123/year=2024/month=09/count
  ry=US/
```

The path to the location may include a path prefix, e.g., "/user/query_engine/warehouse/abtest123" in the example shown above. The path suffix, e.g., "year=2024/month=09/country=US" may refer to a specific partition.

The following code can be used to create a metastore table in metastore 104:

```
CREATE TABLE abtest123events (
   id INT,
   event__name STRING
   event__date STRING
) PARTITIONED BY (year INT, month INT, country STRING);
```

A metastore table may have nested partitions, which means that a partition can have partitions within the partition.

In an example, a metastore table may be partitioned based on time-related columns. For instance, a metastore table may be partitioned based on table columns: year, month, and day: /user/query_engine/warehouse/abtest123/year=2024/month=09/day=18/.

Figure 2:
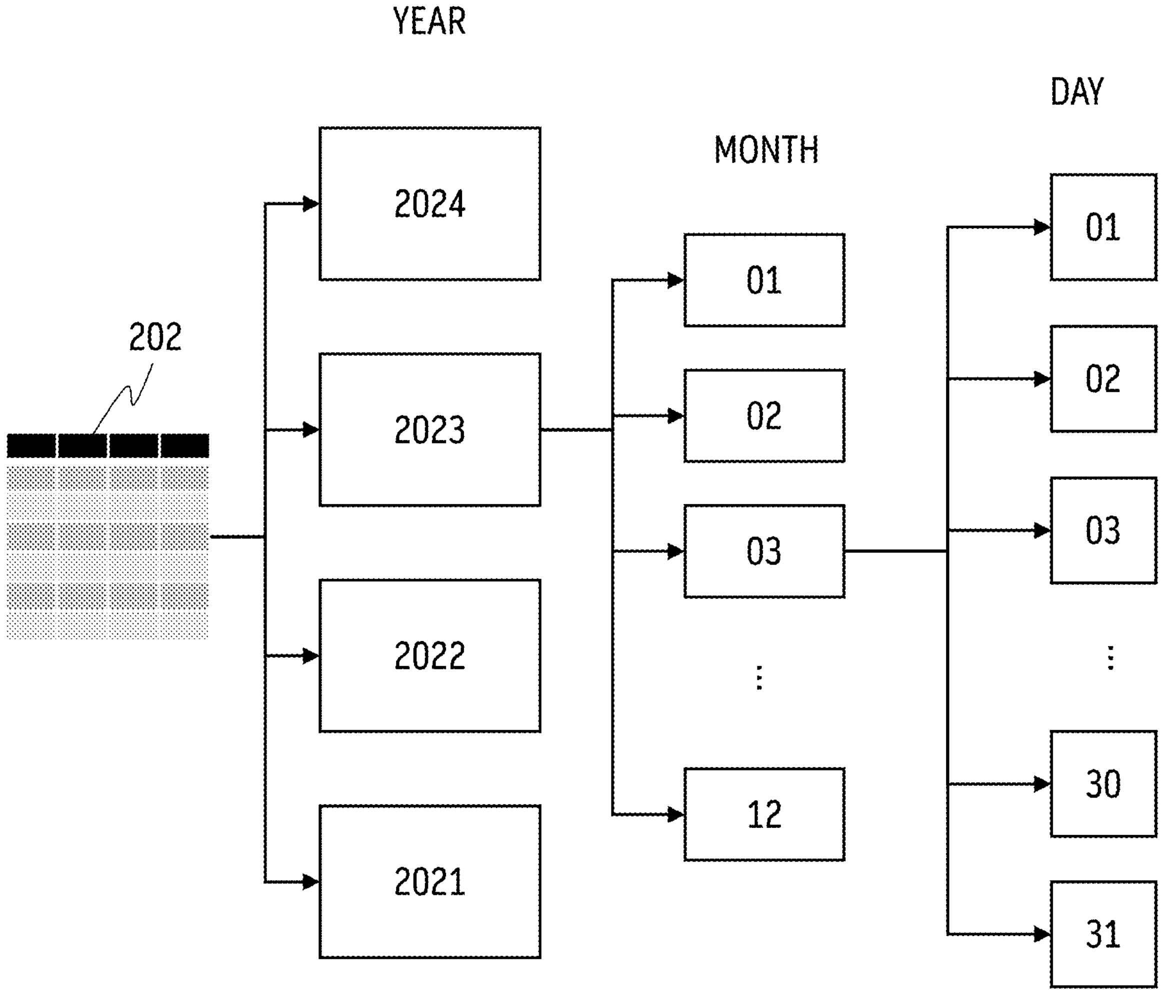
FIG. 2 illustrates partitioning a metastore table by year, month, and day, according to some embodiments of the disclosure.

FIG. 2 illustrates partitioning a metastore table by year, month, and day, according to some embodiments of the disclosure. Metastore table 202 may be partitioned based on year. In the example shown, metastore table 202 may have year partitions, such as year=2024 partition, year=2023 partition, year=2022 partition, and year=2021 partition. The year=2023 partition (and other year-based partitions) can include month partitions including month=01, month=02, month 03, . . . and month 12. The month=03 partition (and other month-based partitions) can include day partitions including day=01, day=02, day 03, . . . day=30, and day 31. In many instances, the big data objects have many time-stamped data entries (e.g., user interactivity logs, device event logs, etc.). Partitioning based on time-related columns can be beneficial for organizing and quickly accessing/filtering the timestamped data entries based on year, month, day, hour, minute, second, etc. For example, partitioning based on time-related columns can make it easy to find data entries having a timestamp that falls within a specified time range. Such partitions may be referred to as time-related partitions of a metastore table.

Big Data Retention Management System

To implement data retention policies, a user can tag a metastore table with a data retention policy. The data retention policy may be associated with a retention period. In some embodiments, the tagging can be implemented using the table properties (TBLPROPERTIES) feature in the query engine 102, allowing users to specify their desired retention policy using a table category property (TABLE_CATEGORY or another suitably named table property). Optionally, users can specify a date partition key (DATE_PARTITION_KEY) as a further table property. The further table property can specify a custom date partition key to which the retention policy applies. Specifying a date partition key allows the user to identify the partition key against which the retention policy is to be applied. Optionally, users can specify a date partition format (DATE_PARTITION_FORMAT) as a yet further table property, in the event that the date partition key uses a specific date format. The yet further table property can specify a custom date format used by the further table property.

A metastore table can be tagged when a table is created. Example code (sometimes referred to herein as the table data definition language (DDL)) to create a metastore table with the table properties described above is shown below:

```
CREATE TABLE `retention__service__db.multi__part__tbl`(
   `id` int,
   `event__name` string,
   `event__date` string)
PARTITIONED BY (
   `other__key1` string,
   `other__key2` string,
   `date__custom__key` string,
   `other__key3` string)
ROW FORMAT SERDES
   'org.io.xyz.serdes.SerDes'
STORED AS INPUTFORMAT
   'org.io.xyz.MapredInputFormat'
OUTPUTFORMAT
   'org.io.MapredOutputFormat'
LOCATION
   'gs://dev/user/retention__service__db/multi__part__tbl'
TBLPROPERTIES (
   'TABLE__CATEGORY'='ARCHIVE__1',
   'DATE__PARTITION__KEY' = 'date__custom__key',
   'DATE__PARTITION__FORMAT' = 'YYYY-mm-dd'
);
```

In some embodiments, metastore tables can support custom date partition keys. An exemplary hash set of various supported date partition keys are as follows:

```
DATE__PARTITION__KEY__NAMES = new HashSet<>(
   Arrays.asList("date__key", "partition__date",
      "month__key", "cohort__month", "month__end",
"activation__month", "streaming__month",
      "report__date", "created__date", "forecast__date__key",
"visit__day", "date__hour",
      "model__version", "processed__time__key",
```

-continued

```
"updated_date",
    "activation_date", "stream_date", "date_time",
    "generation_date", "last_ran_date"));
```

In some embodiments, metastore tables can support custom date formats for the custom date partition keys. An exemplary hash set of various supported date formats are as follows:

```
DATE_TIME_FORMATTER_PATTERNS =
  Arrays.asList("yyyy-MM-dd", "yyyyMMddHHmmss", "MMM-yy",
"yyyy-MM", "yyyyMM", "yyyy", "yyyyMMdd",
    "yyyy-MM-dd-HH", "yyyy-MM-dd, HH:mm:ss", "MM/dd/yyyy,
HH:mm:ss", "yyyy-MM-dd HH:mm:ss.SSS",
    "yyyy-MM-dd HH:mm:ss.SSSSSS", "yyyy-MM-dd
HH%3Amm%3Ass.SSSSSS");
```

The table category property (TABLE_CATEGORY) can refer to a data retention policy by its name or unique identifier. A centralized configuration file can be implemented to include mapping of different values for the table category property to a specific retention policy (e.g., specifying a number of days that data will be retained in non-archive storage). The centralized configuration file can associate different unique names or unique identifiers to different retention policies. A retention policy may include: a name or unique identifier (table_category), a retention period (retention_period), and a retention action (retention_action). The centralized configuration file can ensure consistent application of and centrally managed data retention policies across the big data ecosystem. An example of the centralized configuration file may include:

```
[
  {
    "table_category": "ARCHIVE_1",
    "retention_period": 180,
    "retention_action": "ARCHIVE"
  },
  {
    "table_category": "ARCHIVE_2",
    "retention_period": 360,
    "retention_action": "ARCHIVE"
  },
  {
    "table_category": "DELETE_1",
    "retention_period": 30,
    "retention_action": "DELETE"
  },
  {
    "table_category": "DELETE_2",
    "retention_period": 90,
    "retention_action": "DELETE"
  },
]
```

The retention action can be an archive action, e.g., "ARCHIVE". The archive action may include moving a partition (and the data associated with the partition) to an archive location. The retention action can be a delete action, e.g., "DELETE". The delete action can include deleting the partition (and the data associated with the partition) from its current location. The retention period can specify a number of days. The retention period can specify a period of time a partition is to be retained or kept in its current location.

FIG. 3 illustrates a big data retention management system, according to some embodiments of the disclosure.

Producer 302 (also referred to as partition semantics system), can accurately determine the recency of data. Specifically, producer 302 can determine when the data in time-related partitions is created or generated, which is not necessarily the last-modified time, last-accessed time, nor the partition added time, using time-related partition keys of the metastore table. Producer 302 parses and understands the partition semantics of the partitioned metastore tables in metastore 104. Producer 302 can maintain a list of date/time formats (such as DATE_TIME_FORMATTER_PATTERNS shown above) used for partitioning data across the data warehouse. Producer 302 can include an alerting system that triggers when a partition cannot be parsed using any of the known date-time formats, ensuring comprehensive coverage.

Producer 302 can process the tags in the table properties for a metastore table in metastore 104 and use the centralized configuration file to determine the data retention policy to apply to the partitions in the metastore table. Producer 302 can apply the data retention policy to assess whether one or more partitions created using the time-related partition key falls outside of the retention period of the data retention policy.

In some embodiments, producer 302 can parse a metastore table to extract or ascertain a first table property. The metastore table can have one or more time-related partitions. The first table property can correspond to a retention policy having a retention action and a first retention period.

In some embodiments, producer 302 can determine that the first table property applies to a first time-related partition. In some embodiments, producer 302 can determine that the first retention period applies to the first time-related partition. In response to determining that the first table property applies to the first time-related partition, producer 302 can evaluate the first time-related partition against the first retention period. In response to determining that the first retention period applies to the first time-related partition, producer 302 can evaluate the first time-related partition against the first retention period. The evaluation of a time-related partition against a retention period can assess whether the partition is out-of-retention or not.

In some embodiments, producer 302 can determine that the first time-related partition is outside of the first retention period, that the first time-related partition is an out-of-retention partition, that the first time-related partition is out-of-retention. In response to determining that the first time-related partition is outside of the first retention period, producer 302 can create a retention event specifying the first time-related partition and the retention action.

In some embodiments, producer 302 can store the retention event in a retention events database (e.g., retention events database 304).

For example, producer 302, on 2024-09-18, sees a metastore table has the "ARCHIVE_1" policy illustrated above, and the metastore table has year, month, and day as partition keys. Producer 302 may identify that one or more partitions are outside of the retention period specified in the data retention policy, using the partition key and partition value corresponding to a given partition. For instance, a partition having the following partition key-value pairs, year=2022, month=09, and day=18, would be outside of the retention_period=180 specified in the "ARCHIVE_1" data retention policy, if a current date is year=2024, month=09, and day=22. In some embodiments, producer 302 may evaluate the partition against a retention period by determining a time based on the one or more time-related partition values of the partition (e.g., 2022-09-18) and evaluating the time against a current time (e.g., 2024-09-22). Producer 302 may calculate the amount of time between the time (corresponding to the data objects stored in the partition) and the current time. Producer 302 can assess or determine whether the amount of time is greater than the retention period. If the amount of time is greater than the retention period, the partition is considered to fall outside of the retention period of the retention policy.

Producer 302 may log partitions that exceeded the retention period as retention events. Producer 302 may create a retention event for an out-of-retention partition according to the retention_action=ARCHIVE specified in the "ARCHIVE_1" data retention policy. Producer 302 may create a retention event for more than one out-of-retention partitions. Producer 302 may create a retention event per table having one or more out-of-retention partitions. The retention event for a given table may specify one or more out-of-retention partitions. Producer 302 may create a retention event per out-of-retention partition. Producer 302 may store retention events in retention events database 304 (e.g., a relational datastore), where the retention events may be queued for further processing.

FIG. 4 depicts data fields for a retention event, according to some embodiments of the disclosure. The data fields are illustrative. Some embodiments may opt to include a subset of the data fields. Some embodiments may opt to include one or more additional data field not shown in FIG. 4. Data field "id" may specify a unique identifier for a retention event. Data field "db_name" may specify a name of a database that is storing a particular metastore table. Data field "table_name" may specify a name of the metastore table. Data field "partition_name" may specify a name and/or path of an out-of-retention partition. Data field "partition_name" may specify a list of names and/or paths for a plurality of out-of-retention partitions. Data field "operation_type" may specify one of the enumerated values corresponding to different operations to be performed on one or more out-of-retention partitions specified in the data field "partition_name" (e.g., the enumerated values may include 'ARCHIVE', 'DELETE', and 'RESTORE_EXPIRY'). Data field "retention_period" may specify a retention period. Data field "status" may specify one of the enumerated values corresponding to different statuses of a retention event (e.g., the enumerated values may include 'TO_BE_PROCESSED', 'IN_PROCESSING', 'RETRY', 'FAILED', and 'FINISHED'). Data field "retry_count" may specify a number of times a retention event has been retried. Data field "update_timestamp" may specify when the retention event was last updated. Data field "table_category" may specify unique name/identifier of the retention policy being applied. Data field "restore_request_id" may specify an identifier that identifies a submitted restore request. Data field "status_message" may specify a status message. Data field "transfer_job_ids" may specify one or more identifiers of data transfer jobs being executed for the retention event.

Referring back to FIG. 3, in some embodiments, given that partitions can be nested within another partition, producer 302 can parse from the outermost to the innermost partition, using the first parsable partition as a reference for determining the recency of the data. Phrased differently, data recency is determined based on the outer partition key-value pair, and progress deeper to one or more inner partition key-value pairs to avoid any potential internal conflicts across the nested hierarchy.

Using time-related partition keys as the basis for applying data retention policies is resilient to backfills. Even if old data (e.g., from 2021) is backfilled on 2024-09-18, producer 302 would still recognize the backfilled data as old data and apply the data retention policy according to the partition key-value pair of the partition, and not on a last-modified time, a last-modified time, or a partition added time.

Producer 302 can iterate through and parse (each) metastore table in metastore 104 each day. For a given metastore table, producer 302 can iterate through and evaluate the partitions within the metastore tables against an applicable retention policy each day. Producer 302 can perform parsing of metastore tables at other cadences, e.g., every other day, every week, every month, etc., provided that retention events may not be created or updated for newly out-of-retention partitions straight away (e.g., creating or updating retention events with some delay is tolerated).

One or more consumers 310 (also referred to as event consumption system) can process retention events generated by producer 302 and stored in retention events database 304. The retention events in retention events database 304 identifies partitions to be archived and/or deleted (e.g., partitions where a retention action (retention_action) is to be performed). The retention events in retention events database 304 are consumable by one or more consumers 310. A retention event can cause one or more consumers 310 to perform the identified retention action on the identified partition.

One or more consumers 310 executes the following operations in the following order to ensure data integrity and fault tolerance:

1. Serialization: A consumer in one or more consumers 310 serializes the partition metadata as a JavaScript Object Notation (JSON) string and copies the metadata to an archive storage bucket, which may be located in a different region from the non-archive data. The archived metadata supports future partition restoration if needed.
2. Data Transfer: The consumer creates a storage transfer job or a distributed copy (DistCp) job to copy the data to the destination storage (e.g., an archive storage bucket). The job is configured to delete files at the destination storage that differ from the source or that only exist at the destination storage, making the copy process idempotent and allowing for unlimited retries.
3. Partition Drop: The consumer drops the partition from the metastore 104 before deleting the data. This operation ensures that incomplete data is not exposed to consumers while the deletion is in progress.
4. Data Deletion: The consumer deletes the data from the source storage.

In case of a failure at any of these above operations, the consumer retries all four operations. If the failure occurs during the final deletion operation (#4 Data Deletion), the consumer logs the partition locations to be deleted in a relational store (not shown explicitly in FIG. 3) for future processing.

Data restoration system 320 allows archived data to be restored as needed. Users can submit a request specifying the database, table, schema name, partition name, and the start and end date time range for the data, along with an expiry date for the restored data. Data restoration system 320 can create a restore request based on the request. Data restoration system 320 can store restore requests in restore requests database 306.

FIG. 5 depicts data fields for a restore request, according to some embodiments of the disclosure. The data fields are illustrative. Some embodiments may opt to include a subset of the data fields. Some embodiments may opt to include one or more additional data field not shown in FIG. 5. Data field "id" may specify a unique identifier for a restore request. Data field "db_name" may specify a name of a database that is storing a particular metastore table. Data field "table_name" may specify a name of the metastore table. Data field "start_date" may specify a start date of the restore request. Data field "end_date" may specify an end date of the restore request. Data field "insert_time" may specify a time at which the restore request was created or inserted. Data field "expiry_days" may specify a number of days until the restore request expires or is no longer active. Data field "status" may specify one of the enumerated values corresponding to different statuses of a retention event (e.g., the enumerated values may include 'ACTIVE', and 'EXPIRED').

Referring back to FIG. 3, data restoration system 320 can move the data from archive storage back to non-archive storage and restores the partition metadata. Restored data can remain read-only. Producer 302 may be blocked from creating a retention event for a particular partition if there is an active restore request in restore requests database 306 that applies to the particular partition. A restore request is considered active when the restore request has not yet expired (or today's date is not beyond the expiry date or over the expiry period of the restore request). In some embodiments, producer 302 creates the retention event for an out-of-retention partition only if it is determined that no active restore request is present in restore requests database 306 for the out-of-retention partition.

In some cases, restored data is not deleted from the archive storage to avoid the costs associated with transferring the data back and forth and to prevent early delete charges from archive storage. Once the restored data reaches the specified expiry date, a consumer in one or more consumers 310 can (automatically, or be instructed to) delete the restored data from non-archive storage.

Listener 388 in query engine 102 (also referred to as metastore retention hook) can enforce data retention policies and prevent unauthorized overrides. Listener 388 can be implemented in query engine 102 or with query engine 102. Any retention policy changes are expected to or may go through an approval process. Retention policy changes can only be executed by users with the appropriate role (e.g., RETENTION_ADMIN role). This role grants permission to update retention-related table properties in metastore 104 using query engine 102. Listener 388 is invoked with every DDL transaction and/or data manipulation language (DML) transaction being performed using query engine 102 and enforces one or more of the following rules:

- Table Creation: If a user creates a table without specifying retention policies, the creation will be rejected.
- Retention Property Updates: If a user attempts to update retention-related table properties, such as TABLE_CATEGORY, the change will be rejected unless the user is a RETENTION_ADMIN.
- Partition Additions: Adding a partition older than the retention period will be rejected unless the partition is added by a RETENTION_ADMIN user.

Big Data Retention Management Processes

Figure 6:
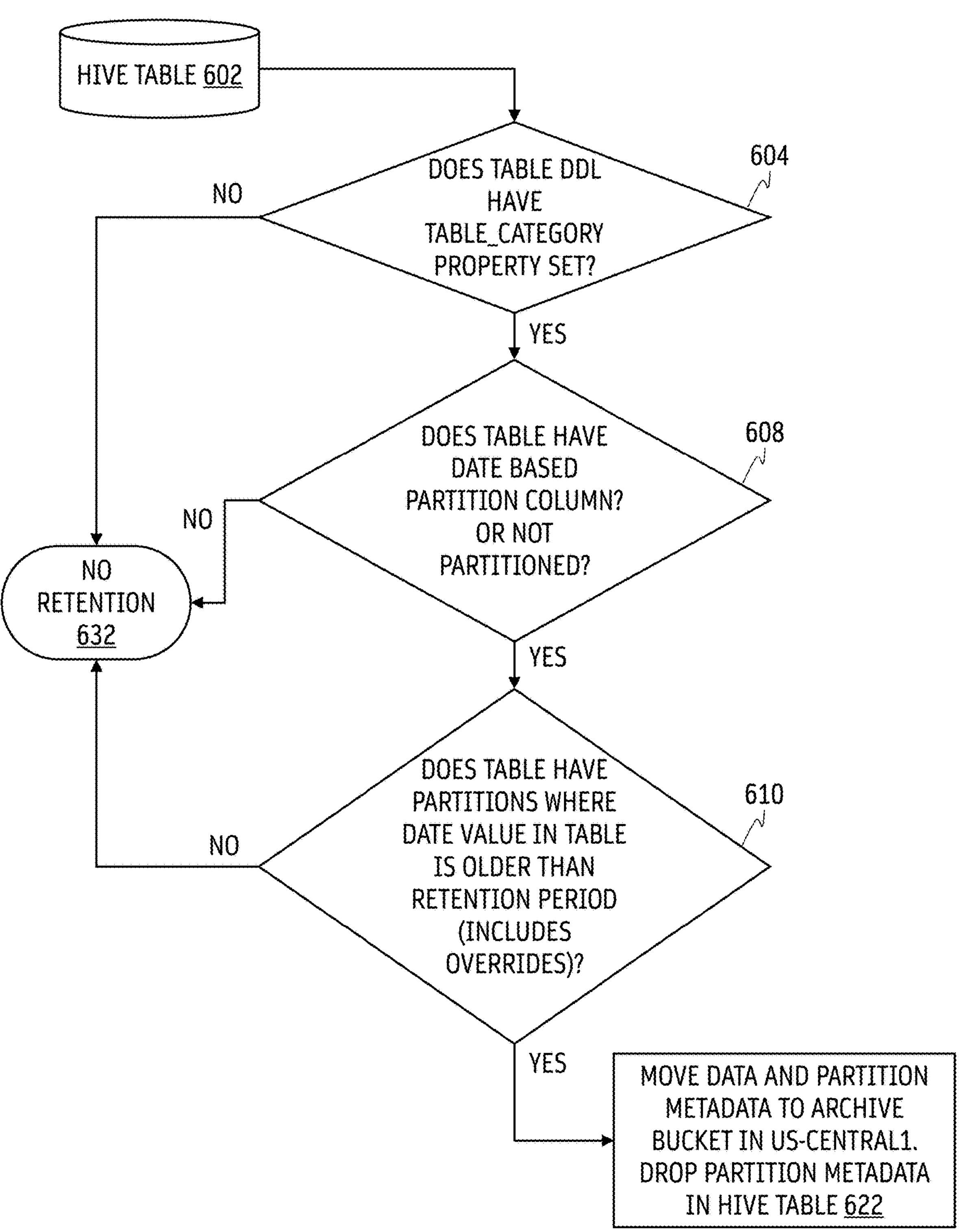
FIG. 6 illustrates data lifecycle using the big data retention system, according to some embodiments of the disclosure.

FIG. 6 illustrates data lifecycle using the big data retention system, according to some embodiments of the disclosure. Hive table 602 represents an example of metastore 104 of FIGS. 1 and 3. The diamond shaped blocks, block 604, block 608, and block 610, represent one or more checks to determine whether a retention action will be performed or not. In 632, no retention action is performed. In 622, a retention event may be created to instruct a consumer to perform one or more retention actions or operations. For example, the consumer may move data and partition metadata to a destination storage location (e.g., an archive location in a particular region such as us-central1) and drop the partition metadata in Hive table 602.

In block 604, a metastore table DDL (table definition using a data definition language) is checked to determine whether the table category property, e.g., TABLE_CATEGORY, has been set, or has a valid value. If yes, the process proceeds to block 608. If no, the process proceeds to 632.

In block 608, the metastore table DDL is checked to determine whether the metastore table is partitioned based on a time-based partition column or has a time-based partition key. If yes, the process proceeds to block 610. If no, the process proceeds to 632.

In some cases, in block 608, the metastore table DDL is checked to determine whether the metastore table is partitioned at all. If it is not partitioned, the process proceeds to 632.

In block 610, one or more individual partitions that have been created based on the time-based partition key are checked whether the time-based partition value (e.g., a year, month, and date) is older than or is outside of the retention period (e.g., a retention period applicable to a given time-based partition). If yes, the process proceeds to 622. If no, the process proceeds to 632.

The checking process represented by the diamond shaped blocks, block 604, block 608, and block 610, may be repeated at a specified frequency (e.g., daily). The checking process represented by the diamond shaped blocks, block 604, block 608, and block 610, may be invoked on demand (e.g., when there is a change in Hive table 602).

Figure 7:
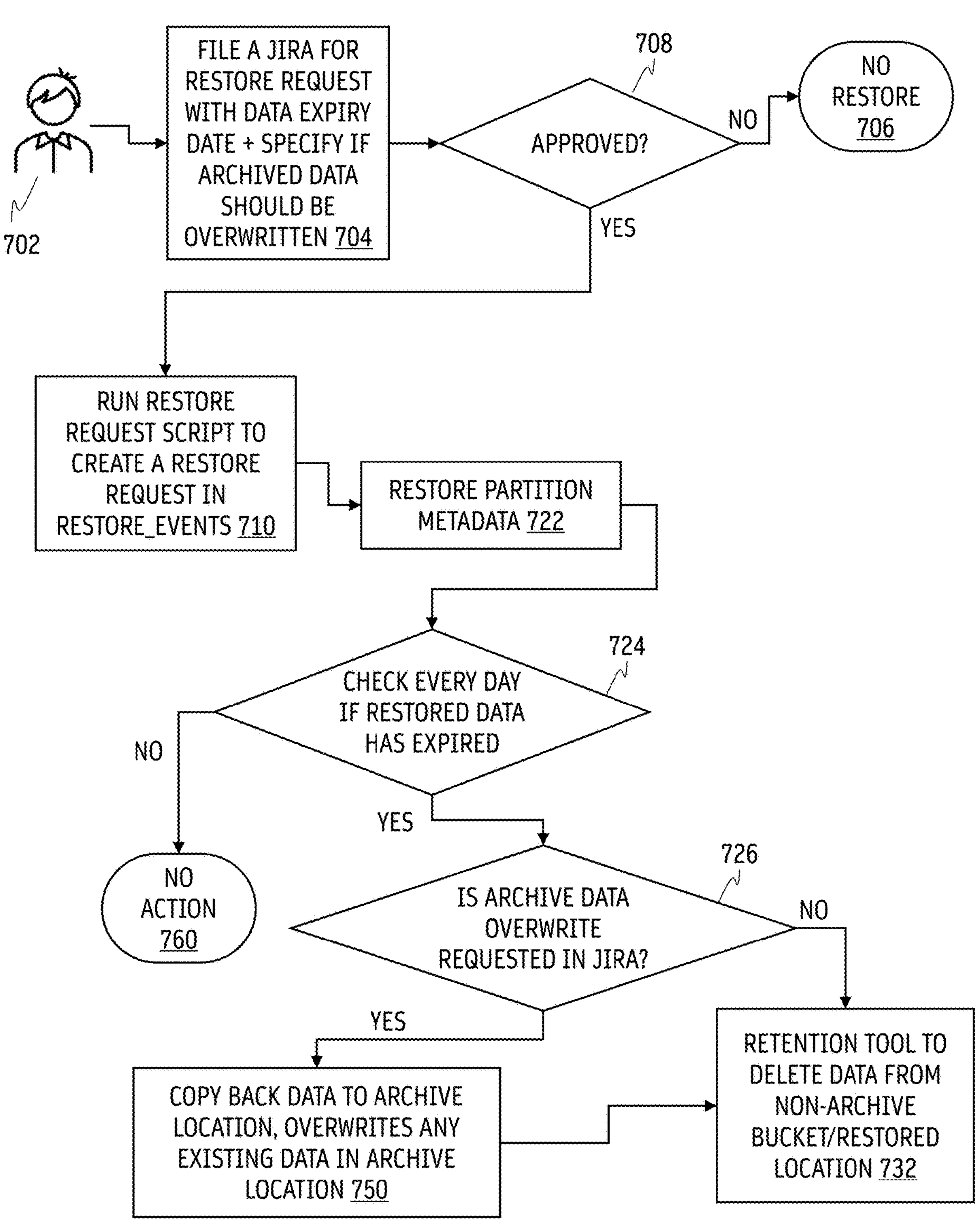
FIG. 7 illustrates an archive data restore process, according to some embodiments of the disclosure.

FIG. 7 illustrates an archive data restore process, according to some embodiments of the disclosure. The archive data restore process can refer to the process for restoring an archived partition back to a restored location. Data consumer 702 represents a user of the big data ecosystem as illustrated in FIG. 1. The depicted flow diagram illustrates a data restoration process that can be initiated by data consumer 702.

In 704, data consumer 702 may submit a restoration ticket. The restoration ticket can be submitted to a software project management system, e.g., Jira. The restoration ticket may include an expiry period or an expiry date, which can indicate how long the data consumer wishes the data to be restored for. For example, data consumer 702 may want to restore the data for 30 days to complete a project. The restoration ticket may specify whether the archived data should be overwritten when the restoration ticket expires, and the user no longer needs the restored data.

In 708, the restoration ticket may be reviewed by one or more authorized parties (e.g., manager of data consumer 702, or the department's director). The cost associated with the restoration may be estimated or determined, and the one or more authorized parties may approve or disapprove of the restoration ticket. If approved, the process proceeds to 710. If disapproved, the process proceeds to 706, which results in no restoration.

In 710, a restore request script may be executed or run, e.g., by data restoration system 320 of FIG. 3, to create a restore request and to store the restore request in a restore requests database, e.g., restore requests database 306 of FIG. 3. The restore request can have the format illustrated in FIG. 4.

In 722, data restoration system 320 may restore the partition metadata in the metastore (e.g., metastore 104 of FIG. 3). The partition metadata may have been archived at an archive location by a consumer (e.g., one or more consumers 310 of FIG. 3) processing a retention event in case the partition metadata is to be restored.

In 724, data restoration system 320 may check regularly (e.g., every day) to determine whether the restore request has expired. If yes, the process proceeds to 726. If no, the process proceeds to 760 where no action is taken.

In 726, data restoration system 320 may check whether an archive data overwrite was requested in the software project management system. If yes, the process proceeds to 750, where the data is copied back to the archive location and overwrites any existing data in archive location (which may update or change the data in the archive location). In some cases, to perform archived data overwrite, an overwrite archived data event may be created by data restoration system 320. Data restoration system 320 may store the overwrite archive data event in retention events database 304 of FIG. 3. The overwrite archived data event can be processed by one or more consumers 310 of FIG. 3 to perform the overwriting of archived restored data in the archive location in a fault tolerant manner. If no, the process proceeds to 732, where data is deleted from the non-archive location or the restored location. In some cases, to perform data deletion, a restored data deletion event may be created by data restoration system 320. Data restoration system 320 may store the restored data deletion event in retention events database 304 of FIG. 3. The restored data deletion event can be processed by one or more consumers 310 of FIG. 3 to perform the deletion of restored data from the non-archive location or the restored location in a fault tolerant manner.

Subsequent to 750, the process proceeds to 732, where data is deleted from the non-archive location or the restored location.

Allowing Updates to Retention Policies, Overrides, and More Fine-Grained Application of Retention Policies within a Metastore Table A table property can be used to specify a table-level retention policy to be applied to a given metastore table. The table-level retention policy can be applied to one or more partitions of the metastore table. The table-level retention policy can be overridden or updated, using the process illustrated in FIG. 8.

Figure 8:
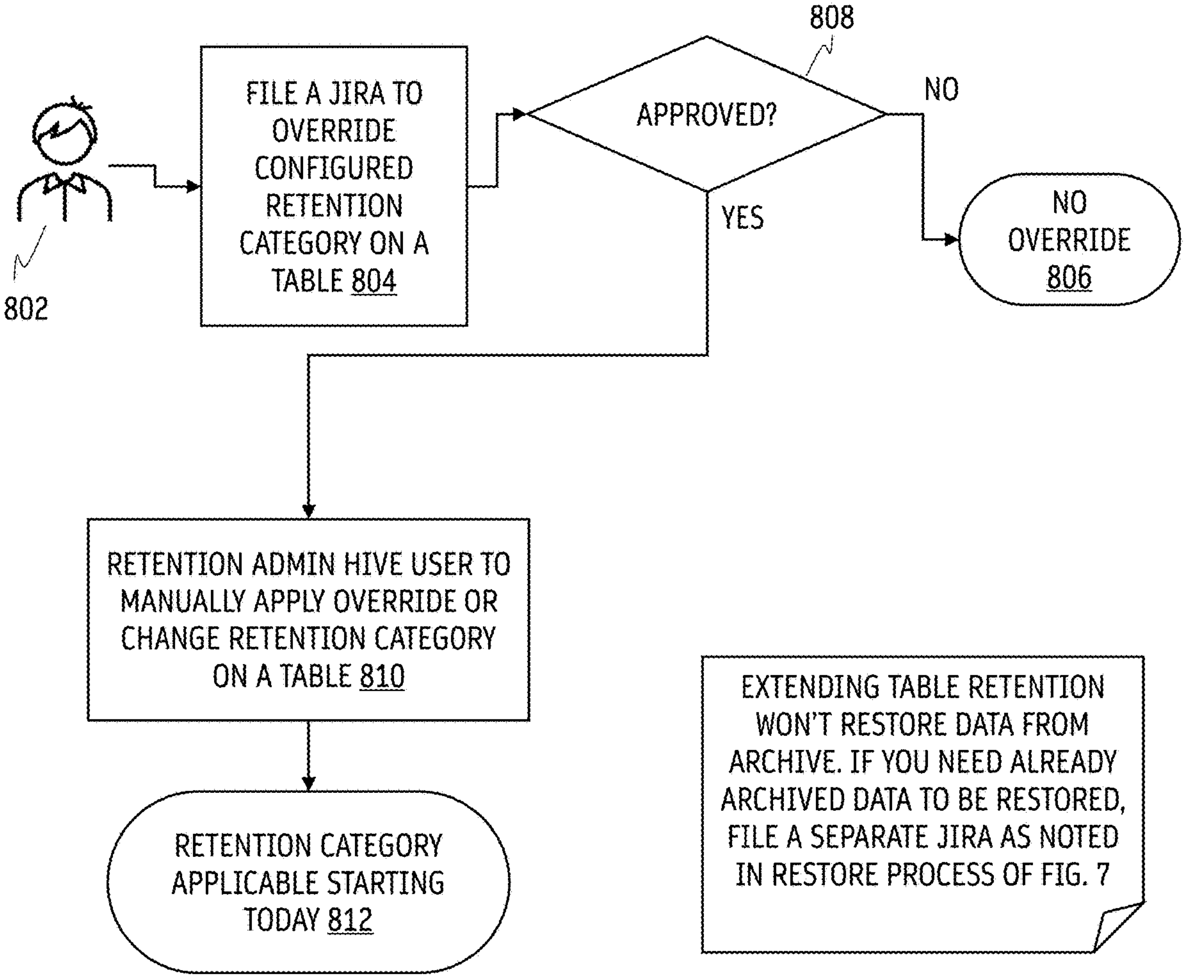
FIG. 8 illustrates a table retention category override process, according to some embodiments of the disclosure.

FIG. 8 illustrates a table retention category override process, according to some embodiments of the disclosure. Data consumer 802 represents a user of the big data ecosystem as illustrated in FIG. 1. The depicted flow diagram illustrates a table retention category override process that can be initiated by data consumer 802. One technical benefit for allowing a table retention category override is to allow for a default retention policy to be applied in the absence of an override. Another technical benefit for allowing a table retention category override is to allow changes to be made to the retention policy to be applied.

In 804, data consumer 802 may submit a ticket to override a configured table property, e.g., TABLE_CATEGORY, for a metastore table. In other words, data consumer 802 may submit a ticket to change the retention policy to be applied to the metastore table. The ticket can be submitted to a software project management system, e.g., Jira. The ticket may specify a revised retention policy for the metastore table.

In 808, the ticket may be reviewed by one or more authorized parties (e.g., the manager of data consumer 802, the department's director). The cost associated with the change in retention policy may be estimated or determined, and the one or more authorized parties may approve or disapprove of the ticket. If approved, the process proceeds to 810. If disapproved, the process proceeds to 806, which results in no override.

In 810, a user with the appropriate role (e.g., RETENTION_ADMIN role) may modify the table DDL for the metastore table to specify an updated value for the table property, e.g., TABLE_CATEGORY. In some cases, the user with the appropriate role may define a new data retention policy based on the requested change in the ticket in the centralized configuration file. The new data retention policy can be mapped to the updated value for the table property, e.g., TABLE_CATEGORY.

In 812, the change to the table DDL becomes effective when the producer (e.g., producer 302 of FIG. 3) parses through the metastore tables again.

In some embodiments, extending the retention period of a data retention policy applied to a metastore table would not restore the already-archived data from the archive location. If a data consumer wants to restore already-archived data, the data consumer can submit a data restoration ticket following the process illustrated in FIG. 7.

A table property, e.g., RETENTION_PERIOD_OVERRIDE, can be used to specify a table-level retention period override, to change the default retention period to be applied to a given metastore table. The specified retention period of the table-level retention period override can be applied instead of the one or more partitions of the metastore table. In response to determining that the retention period of the table-level retention period override applies to the time-related partition of the metastore table, the time-related partition is evaluated against the retention period of the table-level retention period override instead of the retention period of the table-level retention policy. One technical benefit for allowing a table retention period override is to allow for a default retention period to be applied in the absence of an override. Another technical benefit for allowing a table retention period override is to allow changes to be made to the retention period to be applied. An excerpt of the metastore table definition illustrating the retention period override is as follows:

```
CREATE TABLE 'retention__service__db.multi__part__tbl'(
  ...
TBLPROPERTIES (
  'RETENTION__PERIOD__OVERRIDE": '30',
  'TABLE__CATEGORY'='ARCHIVE__1',
  'DATE__PARTITION__KEY' = 'date__custom__key',
  'DATE__PARTITION__FORMAT' = 'YYYY-mm-dd'
);
```

The process of adding a table-level retention period override to a metastore table can be similar to FIG. 8, but with some modifications. In some cases, data consumer 802 may submit a ticket to override a retention period of a retention policy to be applied to the metastore table. If approved, in 810, the user with the appropriate role may modify the table DDL for the metastore table and add a further table property, e.g., RETENTION_PERIOD_OVERRIDE, specifying a retention period that overrides a retention period specified by TABLE_CATEGORY.

In some embodiments, the partition semantics system, or the producer, applies a table-level retention policy based on the table property, e.g., TABLE_CATEGORY. All partitions of the table would get the same retention policy applied to them. If a table-level retention period override is present, the table-level retention period override can be applied by the partition semantics system, or the producer to all partitions of the table.

In some scenarios, it is beneficial to be able to apply different retention policies to different parts of the table at, e.g., partition-level or path-level. Different partitions (e.g., types or kinds of data objects) or path prefixes in the same metastore table may warrant having different retention periods applied thereto. A metastore table may benefit from having more fine-grained retention policies. Phrased differently, application of a retention policy can be conditioned on whether a given time-related partition meets a criterion specified in a filter, or a filter criterion. A retention policy can be applied to filtered portions or parts of a metastore table. If the time-related partition meets the filter criterion, then the specified retention period is applied. The retention period is still evaluated against one or more date/time partition values of one or more date/time partition keys of the time-related partition (e.g., date_key=2024-09-22), but different retention periods may be applied depending on whether the time-related partition meets a criterion of a specified filter. The filter that specifies a criterion of a time-related partition and the retention period to be applied to the time-related partition that meets the criterion can be specified in a table DDL as a table property.

One use case includes different time-related partitions that may have different partition values for a particular partition key. For example, different time-related partitions may have different partition values for a time-grain partition key (e.g., the partition values signify that the partition has data which has been accumulated according to a specified time-grain). Due to the different time-grain, it may be beneficial to specify different retention periods. Examples of such time-related partitions are as follows:

date_key = 2024−07−01 / time_grain = quarter, date_key = 2024−10−01 / time_grain = month, date_key = 2024−12−16 / time_grain = week, and date_key = 2024−12−17 / time_grain = day.

To apply different retention periods for different values of the partition key, a table property can specify one or more filter criteria and one or more corresponding retention period override to be applied. The table property can follow this format, e.g., partition_key1=value1|override_retention_period1, partition_key2=value2|override_retention_period2, . . . , where filters can be separated by comma and a pipe is used as delimiter between a partition key-value pair and a corresponding retention period of a particular filter. In the exemplary format, the table property specifies a first filter criterion specifying a first partition key ('partition_key1') and a first partition value ('value1'), a second filter criterion specifying a second partition key ('partition_key2') and a second partition value ('value2'), and so on. The table property specifies a corresponding retention period ('override_retention_period1') to be applied if the first filter criterion is met, a corresponding retention period ('override_retention_period2') to be applied if the second filter criterion is met, and so on.

For example, a table can include the following table properties:

```
CREATE TABLE 'retention_service_db.multi_part_tbl'(
  ...
TBLPROPERTIES (
  'RETENTION_PARTITION_LEVEL_OVERRIDE_DAYS'=
'time_grain=day|90,time_grain=month|180,time_grain=week|360',
  'RETENTION_PERIOD_OVERRIDE'': '30',
  'TABLE_CATEGORY'='ARCHIVE_1',
  'DATE_PARTITION_KEY' = 'date_custom_key',
  'DATE_PARTITION_FORMAT' = 'YYYY-mm-dd'
);
```

In particular, the table property, 'RETENTION_PARTITION_LEVEL_OVERRIDE_DAYS' (or other named table property) can be used to specify one or more filters. In the example shown, the table property specifies a first filter criterion ('time_grain=day'), a second filter criterion ('time_grain=month'), and a third filter ('time_grain=week). If a time-related partition meets the first filter criterion (the partition has the first partition key-value pair of the first filter criterion), then a retention period of 90 days is applied to the time-related partition (where a time of the time-related partition is evaluated against the 90-day retention period). If a time-related partition meets the second filter criterion (the partition has the second partition key-value pair of the first filter criterion), then a retention period of 180 days is applied to the time-related partition (where a time of the time-related partition is evaluated against the 180-day retention period). If a time-related partition meets the third filter criterion (the partition has the third partition key-value pair of the third filter criterion), then a retention period of 360 days is applied to the time-related partition (where a time of the time-related partition is evaluated against the 360-day retention period).

One use case includes different time-related partitions that may have different path prefixes specifying different partition locations or tiers of partition locations. A time-related partition may have the following path "/user/query_engine/warehouse/abtest123/tier1/year=2024/month=09/country=US1/". A second time-related partition may have the following path "/user/query_engine/warehouse/abtest123/tier2/year=2024/month=09/country=US2/" Different tiered partition locations specified in the path of a time-related partition may warrant different retention policies (e.g., different tiered partition locations may have different costs for retention).

To apply different retention periods for different path prefixes, a table property can specify one or more filter criteria and one or more corresponding retention period override to be applied. The table property can follow this format, e.g., path_prefix1|override_retention_period1, path_prefix2|override_retention_period2, . . . , where filters can be separated by comma and a pipe is used as delimiter between as delimiter between a path prefix and a corresponding retention period of a particular filter. In the exemplary format, the table property specifies a first filter criterion specifying a first path prefix ('path_prefix1'), a second filter criterion specifying a second path prefix ('path_prefix2'), and so on. The table property specifies a corresponding retention period ('override_retention_period1') to be applied if the first filter criterion is met, a corresponding retention period ('override_retention_period2') to be applied if the second filter criterion is met, and so on.

For example, a table can include the following table properties:

```
CREATE TABLE ‘retention__service__db.multi__part__tbl‘(
  ...
TBLPROPERTIES (
  ‘RETENTION__PATH__PREFIX__OVERRIDE__DAYS’=
‘/user/query__engine/warehouse/abtest123/tier1|360,
/user/query__engine/warehouse/abtest123/tier2|120’,
  ‘RETENTION__PERIOD__OVERRIDE”: ‘30’,
  'TABLE__CATEGORY'='ARCHIVE__1',
  'DATE__PARTITION__KEY' = 'date__custom__key',
  'DATE__PARTITION__FORMAT' = 'YYYY-mm-dd'
);
```

In particular, the table property, ‘RETENTION_PATH_PREFIX_OVERRIDE_DAYS’ (or other named table property) can be used to specify one or more filters. In the example shown, the table property specifies a first filter criterion (a path prefix matches ‘/user/query_engine/warehouse/abtest123/tier1’), and a second filter criterion (a path prefix matches ‘/user/query_engine/warehouse/abtest123/tier2’). Ifa time-related partition meets the first filter criterion (the path of the time-related partition has the first path prefix of the first filter), then a retention period of 360 days is applied to the time-related partition (where a time of the time-related partition is evaluated against the 360-day retention period). If a time-related partition meets the second filter criterion (the path of the time-related partition has the second path prefix of the second filter), then a retention period of 120 days is applied to the time-related partition (where a time of the time-related partition is evaluated against the 120-day retention period).

The partition semantics system, or the producer (e.g., producer 302 of FIG. 3), can be responsible for parsing the table properties to extract table properties which may specify the fine-grained application of retention periods at a partition-level or path prefix level. The partition semantics system can apply any specified filters to determine which retention period applies to a given time-related partition.

Users may submit requests to add such table properties (e.g., RETENTION_PATH_PREFIX_OVERRIDE_DAYS, and RETENTION_PARTITION_LEVEL_OVERRIDE_DAYS) using the process illustrated in FIG. 8.

Referring briefly back to FIG. 6, the retention period that is applicable to the time-based partition can be determined based on one or more table properties of a metastore table. A partition semantics system may parse a metastore table and extract one or more table properties. A table property (e.g., TABLE_CATEGORY) can specify a table-level retention policy and a corresponding retention period. A table property (e.g., RETENTION_PERIOD_OVERRIDE) can specify a table-level retention period override and a corresponding retention period that overrides the retention period of the table-level retention policy. In some cases, a table property (e.g., RETENTION_PATH_PREFIX_OVERRIDE_DAYS) can specify a path prefix override and a corresponding retention period that overrides any other retention period. In some cases, a table property (e.g., RETENTION_PARTITION_LEVEL_OVERRIDE_DAYS) can specify a partition-level override and a corresponding retention period that overrides any other retention period.

In some scenarios, only one of the partition-level retention period override table property and the path prefix retention period override table property is set/used to avoid conflicting retention periods being applied when different filter criteria are met by a given time-related partition. Using just one of the partition-level retention period override table property and the path prefix retention period override table property can also prevent confusion or avoid unexpected retention results.

When determining an applicable retention period, the partition semantics system may follow an order of precedence when reviewing the extracted table properties. An applicable retention period for a given time-related partition can be determined based on an order of precedence and one or more table properties of the metastore table. The order of precedence can include, in the following order, a path prefix retention period override or a partition-level retention period override (RETENTION_PATH_PREFIX_OVERRIDE_DAYS or RETENTION_PARTITION_LEVEL_OVERRIDE_DAYS), a table-level retention period override (RETENTION_PERIOD_OVERRIDE), and a table-level retention period (TABLE_CATEGORY).

In one example, table properties of a metastore table can be set as follows:

```
CREATE TABLE ‘retention__service__db.multi__part__tbl‘(
  ...
TBLPROPERTIES (
  ‘RETENTION__PATH__PREFIX__OVERRIDE__DAYS’=
‘/user/query__engine/warehouse/abtest123/tier1|360,
/user/query__engine/warehouse/abtest123/tier2|120’,
  ‘RETENTION__PERIOD__OVERRIDE”: ‘30’,
  'TABLE__CATEGORY'='ARCHIVE__1',
);
```

In the above example, any partition whose path matches /user/query_engine/warehouse/abtest123/tier1 would have a retention period of 360 days applied to the partition, and any partition whose path matches /user/query_engine/warehouse/abtest123/tier2 would have a retention period of 120 days applied to the partition. Any other partitions would have a retention period of 30 days due to the table-level retention period override, ‘RETENTION_PERIOD_OVERRIDE”: ‘30’. The table-level retention policy specifying an archive action (due to ‘TABLE_CATEGORY’=‘ARCHIVE_1’) means that an archive action is to be performed and specified in one or more retention events created for out-of-retention partitions of this metastore table.

In one example, table properties of a metastore table can be set as follows:

```
CREATE TABLE ‘retention__service__db.multi__part__tbl‘(
  ...
TBLPROPERTIES (
  ‘RETENTION__PARTITION__LEVEL__OVERRIDE__DAYS’=
‘data__type=signal1|180,data__type=signal2|90’,
  ‘RETENTION__PERIOD__OVERRIDE”: ‘15’,
  'TABLE__CATEGORY'='DELETE__1',
);
```

In the above example, any partition that has a partition key-value data_type=signal1 would have a retention period of 180 days applied to the partition, and any partition that has a partition key-value data_type=signal2 would have a retention period of 90 days applied to the partition. Any other partitions would have a retention period of 15 days due to the table-level retention period override, ‘RETENTION_PERIOD_OVERRIDE”: ‘15’. The table-level retention policy specifying a delete action (due to ‘TABLE_CATEGORY’=‘DELETE_1’) means that a delete action is to be performed and specified in one or more retention events created for out-of-retention partitions of this metastore table.

Referring again to FIG. 3, changes to the table properties and allowing for additional overrides such as table-level retention period override, partition-level retention period override, and path prefix retention period override does not necessarily impact the operations of one or more consumers 310. Instead of creating a single retention event for a metastore table, producer 302 can create a single retention event for different parts of a metastore table having the same retention period applied thereto. Producer 302 can create different retention events for different parts of a metastore table having different retention periods applied thereto. The retention event may specify the different parts of the metastore table that have the same retention period, in addition to specifying the metastore table. In some cases, producer 302 may append a list of out-of-retention partitions to the retention event. In some cases, to facilitate debugging purposes, producer 302 may include the partition-level retention period override or a path prefix retention period override as a data field in the retention event.

Data restoration system 320 can accommodate user requests specifying a restore request of one or more parts of a metastore table that meets a filter criteria. If the filter criteria is set (e.g., at a partition-level, or using a path prefix), data restoration system 320 can perform a data restoration process for partitions that meet the filter criteria (only). An example of a restore request can be as follows:

```
# Restore config
RETENTION_SERVICE_RESTORE_DATABASE_NAME=retention_service_test_
db
RETENTION_SERVICE_RESTORE_TABLE_NAME=restore_test_tbl
RETENTION_SERVICE_RESTORE_START_DATE=1970-01-01
RETENTION_SERVICE_RESTORE_END_DATE=1970-01-01
RETENTION_SERVICE_RESTORE_DATE_FORMAT=yyyy-MM-dd
RETENTION_SERVICE_RESTORE_THREADS=5
RETENTION_SERVICE_RESTORE_EXPIRY_DAYS=30
RETENTION_SERVICE_RESTORE_PARTITION_FILTER=log_id=error
```

Data restoration system 320 can examine time-related partitions of the specified metastore table (restore_test_tbl) using a partition date key for the metastore table. Time-related partitions that meet the filter criterion (log_id=error) can be restored to a restored location according to specified expiry days (e.g. 30 days).

Listener 388 may be modified to block unauthorized changes to the table properties, such as adding a table-level retention period override, adding a partition-level retention period override, and adding a path prefix retention period override.

Support for Other Query Engines

In some cases, instead of Apache Hive, the query engine may be implemented using Iceberg or other architectures where the operations and features can differ from Apache Hive. With Iceberg, partition metadata is collocated with data objects in Google Cloud Storage (GCS), and accessed using Iceberg. Iceberg supports snapshots, time travel, and git-like branching and tagging. Retention actions (e.g., moving partitions to an archive location, or deleting partitions) and restore mechanism (e.g., moving archived partitions back to a restored location) would implemented differently. In Iceberg, snapshots mean that each data or metadata change on a table is recorded as a snapshot. Time travel means that it is possible to go back to a previous table snapshot and query the table at that snapshot point. Iceberg tables have the table DDL defined in a metastore. The remaining metadata (e.g., partition metadata, snapshots, etc.) are stored in object storage, e.g., under a metadata directory under table location.

Figure 9:
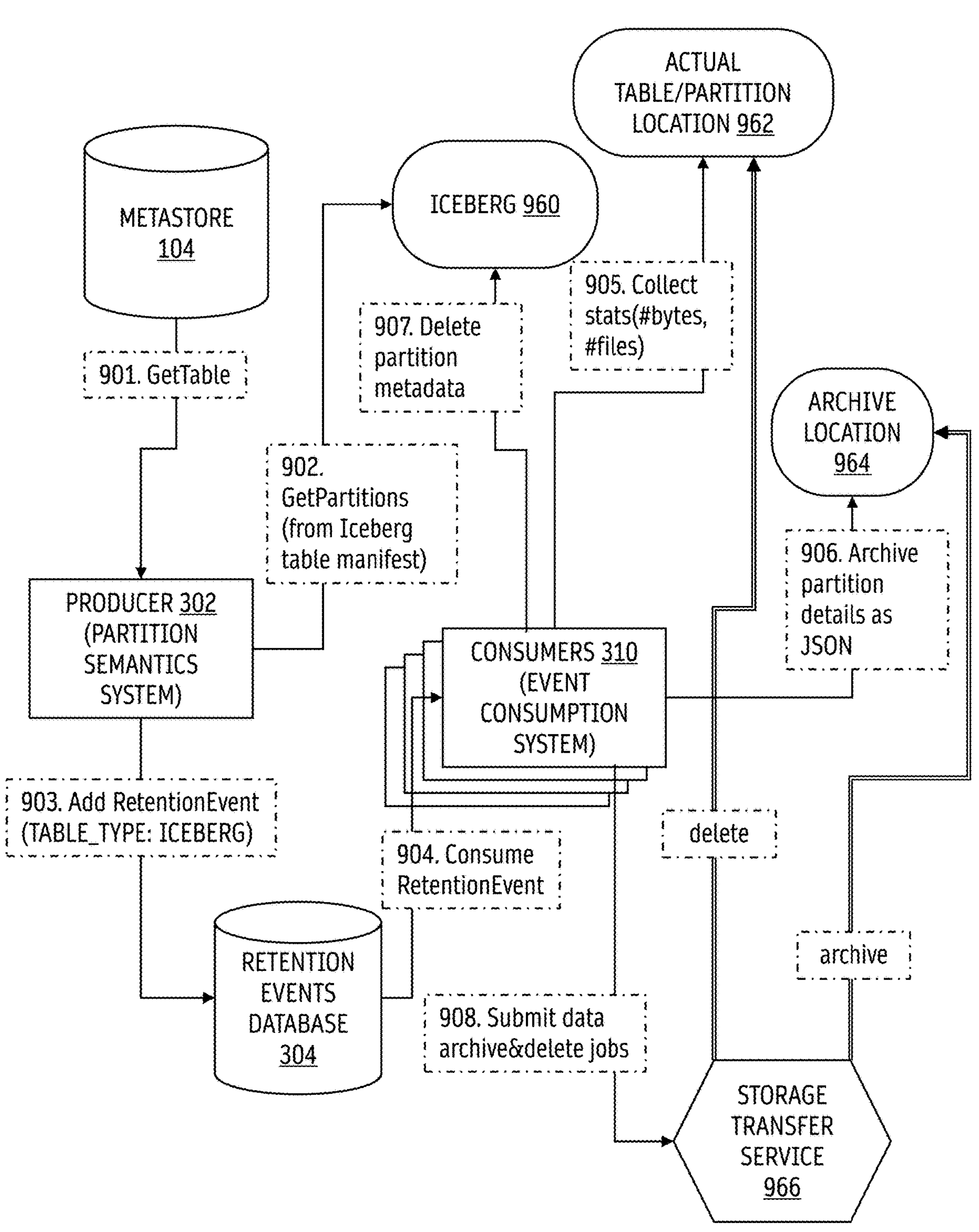
FIG. 9 illustrates data retention with Iceberg support, according to some embodiments of the disclosure.

FIG. 9 illustrates data retention with Iceberg support, according to some embodiments of the disclosure.

In 901, a function "GetTable" is used to retrieve a metastore table (e.g., a table DDL) from metastore 104. In 902, a function "GetPartitions" is used to retrieve partition metadata from Iceberg 960, which may parse the metadata manifests of the table to obtain the partition metadata for the metastore table. In 903, producer 302 performs parsing to determine one or more out-of-retention partitions based on the information obtained by "GetPartitions" and creates a retention event accordingly. The retention event is added to retention events database 304. Because retention actions are to be performed differently, the retention event has a data field "table_type" to indicate that Iceberg is used. The data field may be specified as follows:

```
TABLE_TYPE        ENUM('HIVE', 'ICEBERG') DEFAULT 'HIVE'.
```

In 904, one or more consumers 310 consumes the retention event. In 905, one or more consumers 310 collect and record data statistics which are to be used later for validation of the retention operation. Statistics may include one or more of: total files count (#files), and total bytes (#bytes). In 906, one or more consumers 310 archives partition metadata which can be later used in the restoration process. The archived partition metadata can follow a JSON structure as follows:

```
{
  "name": "date_key=2024-01-01/layer=layer1/type=dimension",
  "table": "schema.iceberg_table_name",
  "date_key_name": "date_key",
  "location": "warehouse/data/schema/tbl/date_key=2024-01-
  01/layer=layer1/type=dimension
}
```

In 907, one or more consumers 310 deletes partition metadata from Iceberg 960. An example set of commands can be as follows:

```
Table table =
catalog.loadTable(TableIdentifier.of("database", "table"));
// Filter partitions to delete
Expression filter = Expressions.equal("partition_column",
"partition_value");
// Perform metadata-only delete
```

-continued

```
table.newDelete( )
.deleteFromRowFilter(filter)
.commit( );
```

In 908, one or more consumers 310 submit data archive and/or delete jobs to storage transfer service 966. Storage transfer service 966 archives (copies) data from actual table/partition location 962 to archive location 964. Storage transfer service 966 also deletes the data from actual table/partition location 962. One or more consumers 310 can verify the completion of the retention action using the statistics collected in 905.

For the restoration process, one or more consumers 310 may consume a restore event and use an add_files procedure in Iceberg to add a directory and specify which partition the directory belongs to. Iceberg can be notified to add files as part of a time-related partition through the add_files procedure. The add_files procedure specify a partition filter (e.g., partition key-value pairs) and a mapping of archived location for each partition filter. The add_files procedure can make use of archived partition metadata from 906 for the add_files procedure.

Method for Data Retention with Partition Semantics Awareness

Figure 10:
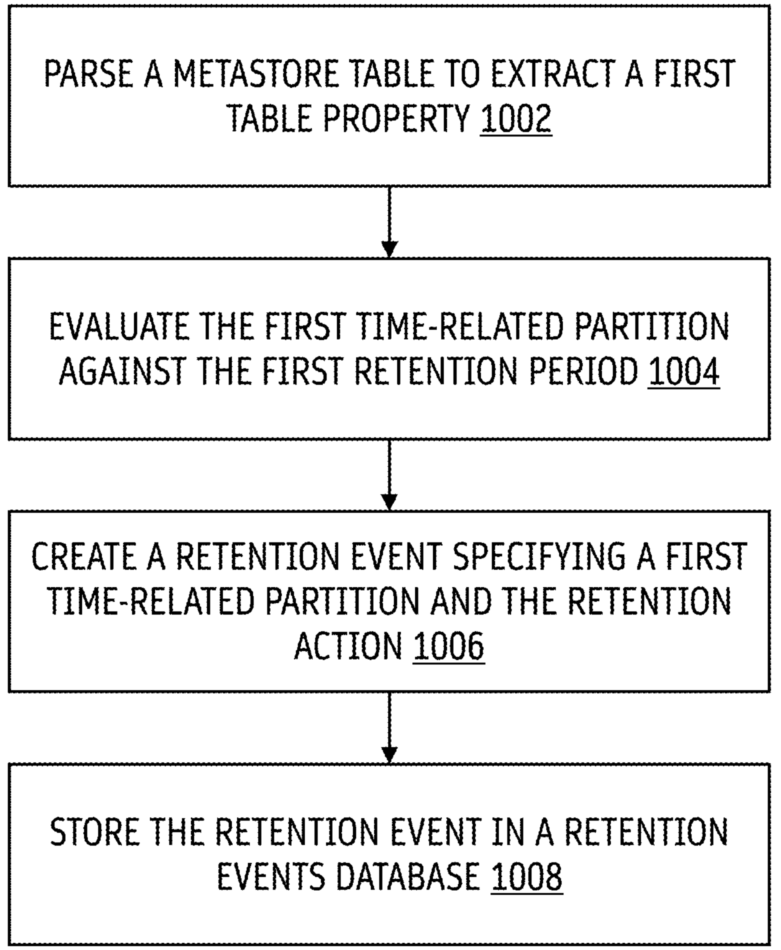
FIG. 10 depicts a flow chart illustrating a method for data retention, according to some embodiments of the disclosure.

FIG. 10 depicts a flow chart illustrating method 1000 for data retention, according to some embodiments of the disclosure. Method 1000 can be performed by one or more components illustrated in FIG. 3. Method 1000 can be performed by one or more components illustrated in FIG. 9.

In 1002, a metastore table is parsed to extract a first table property. The metastore table has one or more time-related partitions. The first table property corresponds to a retention policy having a retention action and a first retention period.

In 1004, in response to determining that the first retention period applies to a first time-related partition of the metastore table, the first time-related partition is evaluated against the first retention period.

In 1006, in response to determining that the first time-related partition is out-of-retention, a retention event can be created. The retention event specifying the first time-related partition and the retention action.

In 1008, the retention event is stored in a retention events database, e.g., for further processing/consumption.

Technical Advantages

The described embodiments handle data retention with partition semantic awareness (e.g., data retention is based on how metastore tables are partitioned, or data retention is applied based on the time-based partition key-value pairs associated with the partitions). Referring back to FIGS. 3 and 9, producer 302 can understand custom time-based partition keys and date formats. This means that users can specify a time-based partition key for data retention and the date format for the time-based partition key in a flexible way easily through the table DDL.

Producer 302 can apply centrally managed and maintained data retention policies. Also, producer 302 has an alert system to detect unparsable date formats. The result is a robust data retention system that can be easily deployed to manage data retention for big data warehouses with many metastore tables.

Implementing the system illustrate in FIGS. 3 and 9 means that the archive location can be any specified archive location. For example, the archive location can be in a different region within same cloud such as Amazon S3 or GCP, or in a different cloud such as non-archive storage in GCP and archive storage in S3), or a disk hosted in local infrastructure. The flexibility in choosing the archive location can mean that costs for archiving data can optimized with fewer constraints. Data transfer implemented in the system shown in FIGS. 3 and 9 is independent from the cloud. As long as the destination storage is specified correctly and configured accurately in the retention events, one or more consumers 310 can archive data to any desired destination location.

One or more consumers 310 is fault tolerant and can guarantee no loss of data. One or more consumers 310 can prevent exposure of incomplete data to users even when working with millions of objects.

Using the time-based partition key-value pairs as a basis for data recency means that data can be privacy protected in its truest sense. Applying data retention policies based on the semantics of the data (e.g., partition key-value pairs used to partition timestamped data), user/device data which belongs to a certain time (e.g., having a particular timestamp at the point of creation or generation of the data) is guaranteed to be archived (and eventually deleted) at the expected time according to the specified retention period, irrespective of any data backfills or partition add and drops which can alter last-modified time, last-accessed time, or partition added time.

The system illustrated in FIGS. 3 and 9 is cost effective and cost efficient. The system does not add significant overhead to infrastructure management, yet the system can allow significant cost optimization with storage costs. For instance, archiving data in the same region (e.g., US-EAST) as non-archive data can be ~2× more costly than archiving the data in a different region (US-CENTRAL) from the non-archive data. While there can be one-time transfer charges associated when moving data outside a region, it is possible to break even with these costs within the months. If users expect their data to stay in archive storage for at least 6 months, being able to archive data in different regions can result in significant savings (e.g., $1,250 per petabyte per month).

The system illustrated in FIGS. 3 and 9 is more flexible than out of the box solutions like S3-INT and GCP autoclass which transition data primarily based on access patterns and work on a fixed schedule or waiting periods (e.g., 30 days, 60 days, 180 days of no access, etc.). For instance, with the system illustrated in FIGS. 3 and 9, if restored data is not needed after 30 days, it is possible to move the data to archive storage on the 31st day without waiting for 365 days.

Implementing the system illustrated in FIGS. 3 and 9 also means that it is possible to avoid management fees for objects in archive storage (e.g., $0.0025 per 1000 objects per month), which can be significant for data warehouses with billions of objects.

The ability to effectively use time-based partition keys to perform data retention, deletion, and/or archival can result in much more efficient utilization of object storage resources and eliminate wasteful spending. In some calculations, annual cost savings of moving data to a lower cost region (e.g., US-CENTRAL1) from standard object storage class in a higher cost region (e.g., US-EAST1) is close to $93,000 per petabyte. Annual cost savings of moving data to a lower cost region (e.g., US-CENTRAL1) from nearline object storage class in a higher cost region (e.g., US-EAST1) is close to $72,000 per petabyte. Annual cost savings of moving data to a lower cost region (e.g., US-CENTRAL1) from coldline object storage class in a higher cost region (e.g., US-EAST1) is close to $50,000 per petabyte. Annual cost savings of moving data to a lower cost region (e.g., US-CENTRAL1) from archive object storage class in a higher cost region (e.g., US-EAST1) is close to $17,000 per petabyte.

Exemplary Computing Device

Figure 11:
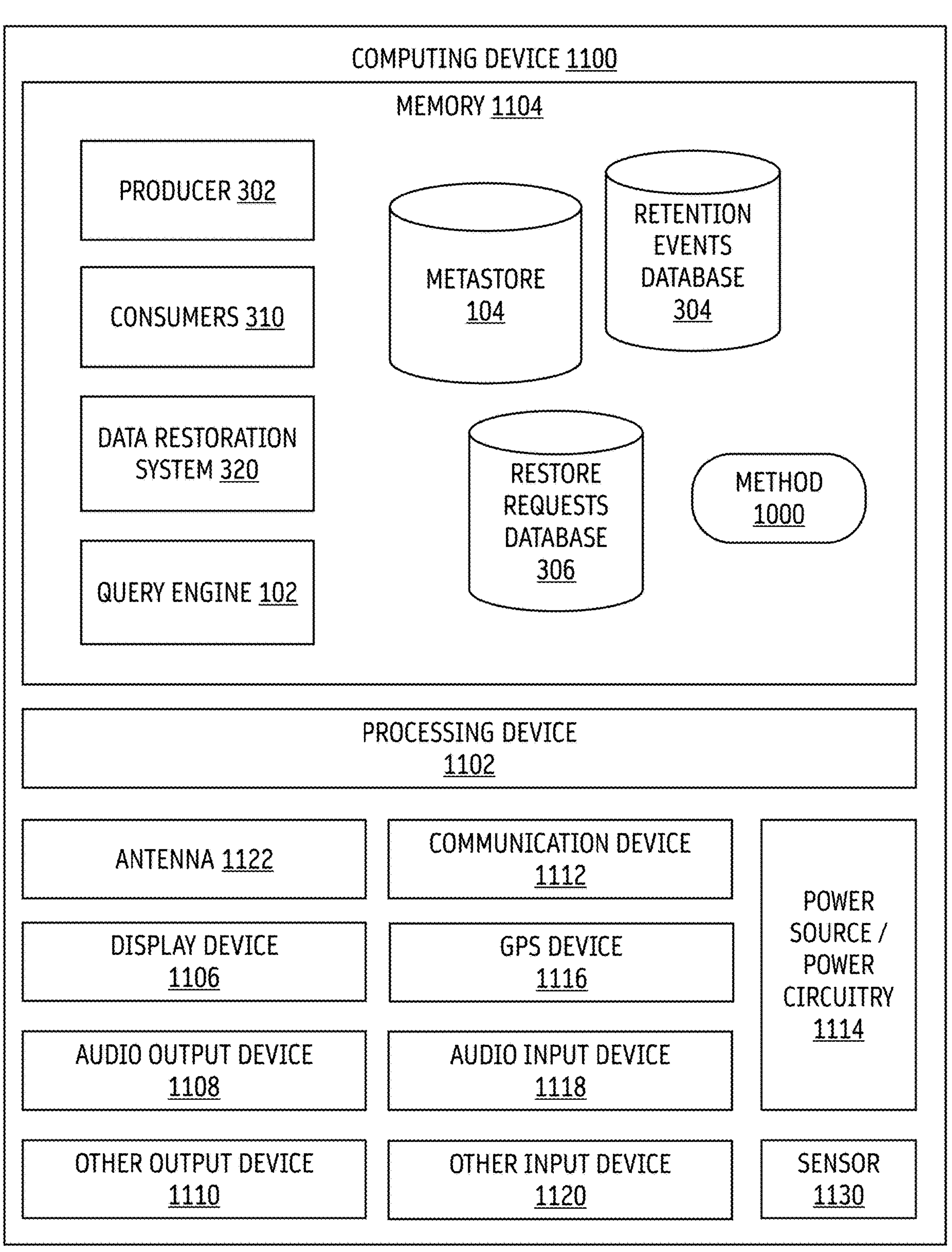
FIG. 11 is a block diagram of an exemplary computing device, according to some embodiments of the disclosure.

FIG. 11 is a block diagram of an exemplary computing device 1100, according to some embodiments of the disclosure. One or more computing devices 1100 may be used to implement the functionalities described with the FIGS. and herein. A number of components are illustrated in FIG. 11. As included in the computing device 1100, but any one or more of these components may be omitted or duplicated, as suitable for the application. In some embodiments, some or all of the components included in the computing device 1100 may be attached to one or more motherboards. In some embodiments, some or all of these components are fabricated onto a single system on a chip (SoC) die. Additionally, in various embodiments, the computing device 1100 may not include one or more of the components illustrated in FIG. 11, and the computing device 1100 may include interface circuitry for coupling to the one or more components. For example, the computing device 1100 may not include a display device 1106, and may include display device interface circuitry (e.g., a connector and driver circuitry) to which a display device 1106 may be coupled. In another set of examples, the computing device 1100 may not include an audio input device 1118 or an audio output device 1108 and may include audio input or output device interface circuitry (e.g., connectors and supporting circuitry) to which an audio input device 1118 or audio output device 1108 may be coupled.

The computing device 1100 may include a processing device 1102 (e.g., one or more processing devices, one or more of the same type of processing device, one or more of different types of processing device). The processing device 1102 may include electronic circuitry that process electronic data from data storage elements (e.g., registers, memory, resistors, capacitors, quantum bit cells) to transform that electronic data into other electronic data that may be stored in registers and/or memory. Examples of processing device 1102 may include a central processing unit (CPU), a graphical processing unit (GPU), a quantum processor, a machine learning processor, an artificial-intelligence processor, a neural network processor, an artificial-intelligence accelerator, an application specific integrated circuit (ASIC), an analog signal processor, an analog computer, a microprocessor, a digital signal processor, a field programmable gate array (FPGA), a tensor processing unit (TPU), a data processing unit (DPU), etc.

The computing device 1100 may include a memory 1104, which may itself include one or more memory devices such as volatile memory (e.g., DRAM), nonvolatile memory (e.g., read-only memory (ROM)), high bandwidth memory (HBM), flash memory, solid state memory, and/or a hard drive. Memory 1104 includes one or more non-transitory computer-readable storage media. In some embodiments, memory 1104 may include memory that shares a die with the processing device 1102.

In some embodiments, memory 1104 includes one or more non-transitory computer-readable media storing instructions executable to perform operations described herein, including operations of method 1000. Memory 1104 may store instructions that encode one or more exemplary parts, components, or modules depicted in the FIGS. The instructions stored in the one or more non-transitory computer-readable media may be executed by processing device 1102. Examples of parts, components, or modules can include producer 302, one or more consumers 310, data restoration system 320, query engine 102, and one or more parts illustrated in FIG. 9. In some embodiments, memory 1104 may store data, e.g., data structures, binary data, bits, metadata, events, databases, files, blobs, etc., as described herein. Examples include big data, retention events in retention events database 304, restore requests in restore requests database 306, and metastore 104.

In some embodiments, the computing device 1100 may include a communication device 1112 (e.g., one or more communication devices). For example, the communication device 1112 may be configured for managing wired and/or wireless communications for the transfer of data to and from the computing device 1100. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not. The communication device 1112 may implement any of a number of wireless standards or protocols, including but not limited to Institute for Electrical and Electronic Engineers (IEEE) standards including Wi-Fi (IEEE 802.10 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for worldwide interoperability for microwave access, which is a certification mark for products that pass conformity and interoperability tests for the IEEE 802.16 standards. The communication device 1112 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication device 1112 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication device 1112 may operate in accordance with Code-division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication device 1112 may operate in accordance with other wireless protocols in other embodiments. The computing device 1100 may include an antenna 1122 to facilitate wireless communications and/or to receive other wireless communications (such as radio frequency transmissions). The computing device 1100 may include receiver circuits and/or transmitter circuits. In some embodiments, the communication device 1112 may manage wired communications, such as electrical, optical, or any other suitable communication protocols (e.g., the Ethernet). As noted above, communication device 1112 may include multiple communication chips. For instance, a first communication device 1112 may be dedicated to shorter-range wireless communications such as Wi-Fi or Bluetooth, and a second communication device 1112 may be dedicated to longer-range wireless communications such as global positioning system (GPS), EDGE, GPRS, CDMA, WiMAX, LTE, EV-DO, or others. In some embodiments, a first communication device 1112 may be dedicated to wireless communications, and a second communication device 1112 may be dedicated to wired communications.

The computing device 1100 may include power source/power circuitry 1114. The power source/power circuitry 1114 may include one or more energy storage devices (e.g., batteries or capacitors) and/or circuitry for coupling components of the computing device 1100 to an energy source separate from the computing device 1100 (e.g., DC power, AC power, etc.).

The computing device 1100 may include a display device 1106 (or corresponding interface circuitry, as discussed above). Display device 1106 may include any visual indicators, such as a heads-up display, a computer monitor, a projector, a touchscreen display, a liquid crystal display (LCD), a light-emitting diode display, or a flat panel display, for example.

The computing device 1100 may include an audio output device 1108 (or corresponding interface circuitry, as discussed above). The audio output device 1108 may include any device that generates an audible indicator, such as speakers, headsets, or earbuds, for example.

The computing device 1100 may include an audio input device 1118 (or corresponding interface circuitry, as discussed above). The audio input device 1118 may include any device that generates a signal representative of a sound, such as microphones, microphone arrays, or digital instruments (e.g., instruments having a musical instrument digital interface (MIDI) output). In some embodiments, the audio input device 1118 is a remote control having a microphone. In some embodiments, the audio input device 1118 is a mobile device communicably connected with computing device 1100, where the mobile device has a microphone.

The computing device 1100 may include a GPS device 1116 (or corresponding interface circuitry, as discussed above). The GPS device 1116 may be in communication with a satellite-based system and may receive a location of the computing device 1100, as known in the art.

The computing device 1100 may include a sensor 1130 (or one or more sensors). The computing device 1100 may include corresponding interface circuitry, as discussed above). Sensor 1130 may sense physical phenomenon and translate the physical phenomenon into electrical signals that can be processed by, e.g., processing device 1102. Examples of sensor 1130 may include: capacitive sensor, inductive sensor, resistive sensor, electromagnetic field sensor, light sensor, camera, imager, microphone, pressure sensor, temperature sensor, vibrational sensor, accelerometer, gyroscope, strain sensor, moisture sensor, humidity sensor, distance sensor, range sensor, time-of-flight sensor, pH sensor, particle sensor, air quality sensor, chemical sensor, gas sensor, biosensor, ultrasound sensor, a scanner, etc.

The computing device 1100 may include another output device 1110 (or corresponding interface circuitry, as discussed above). Examples of the other output device 1110 may include an audio codec, a video codec, a printer, a wired or wireless transmitter for providing information to other devices, haptic output device, gas output device, vibrational output device, lighting output device, home automation controller, or an additional storage device.

The computing device 1100 may include another input device 1120 (or corresponding interface circuitry, as discussed above). Examples of the other input device 1120 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing device 1100 may have any desired form factor, such as a handheld or mobile computer system (e.g., a cell phone, a smart phone, a mobile internet device, a music player, a tablet computer, a laptop computer, a netbook computer, a personal digital assistant (PDA), an ultramobile personal computer, a remote control, wearable device, headgear, eyewear, footwear, electronic clothing, etc.), a desktop computer system, a server or other networked computing component, a printer, a scanner, a monitor, a set-top box, an entertainment control unit, a television, a media player, a vehicle control unit, a digital camera, a digital video recorder, an Internet-of-Things device (e.g., light bulb, cable, power plug, power source, lighting system, audio assistant, audio speaker, smart home device, smart thermostat, camera monitor device, sensor device, smart home doorbell, motion sensor device), a virtual reality system, an augmented reality system, a mixed reality system, or a wearable computer system. In some embodiments, the computing device 1100 may be any other electronic device that processes data.

SELECT EXAMPLES

Example 1 provides a method for data retention, including parsing a metastore table to extract a first table property, the metastore table having one or more time-related partitions, the first table property corresponding to a retention policy having a retention action and a first retention period; in response to determining that the first retention period applies to a first time-related partition of the metastore table, evaluating the first time-related partition against the first retention period; in response to determining that the first time-related partition is out-of-retention, creating a retention event specifying the first time-related partition and the retention action; and storing the retention event in a retention events database.

Example 2 provides the method of example 1, where evaluating the first time-related partition against the first retention period includes determining a time based on one or more time-related partition values of the first time-related partition; and evaluating the time against a current time.

Example 3 provides the method of example 1 or 2, further including parsing the metastore table to extract a second table property specifying a custom date partition key to which the retention policy applies.

Example 4 provides the method of example 3, further including parsing the metastore table to extract a third table property specifying a custom date format used by the custom date partition key.

Example 5 provides the method of any one of examples 1-4, where the retention action is an archive action. <u> </u>

Example 6 provides the method of any one of examples 1-4, where the retention action is a delete action.

Example 7 provides the method of any one of examples 1-6, where the first retention period specifies a number of days.

Example 8 provides the method of any one of examples 1-7, where the first table property includes a unique identifier identifying the retention policy in a configuration file that associates different unique identifiers to different retention policies.

Example 9 provides the method of any one of examples 1-8, where the retention event is consumable by a consumer and causes the consumer to perform the retention action on the first time-related partition.

Example 10 provides the method of any one of examples 1-9, where creating the retention event is performed in response to determining that no active restore request is present for the first time-related partition.

Example 11 provides the method of any one of examples 1-10, further including parsing the metastore table to extract a fourth table property specifying a second retention period overriding the first retention period; and in response to determining that the second retention period applies to the first time-related partition of the metastore table, evaluating the first time-related partition against the second retention period.

Example 12 provides the method of any one of examples 1-11, further including parsing the metastore table to extract a fifth table property specifying a filter criterion and a third retention period overriding the first retention period; and in response to determining that the third retention period applies to the first time-related partition of the metastore table based on the first time-related partition meeting the filter criterion, evaluating the first time-related partition against the third retention period.

Example 13 provides the method of example 12, where the filter criterion specifies a partition key and a partition value.

Example 14 provides the method of example 12, where the filter criterion specifies a path prefix.

Example 15 provides the method of any one of examples 1-13, further including determining an applicable retention period for the first time-related partition based on an order of precedence and one or more table properties of the metastore table, the order of precedence including, in the following order, a path prefix retention period override or a partition-level retention period override, a table-level retention period override, and a table-level retention period.

Example 16 provides one or more non-transitory computer-readable media storing instructions that, when executed by one or more processors, cause the one or more processors to: parse a metastore table to extract a first table property, the metastore table having one or more time-related partitions, the first table property corresponding to a retention policy having a retention action and a first retention period; in response to determining that the first retention period applies to a first time-related partition of the metastore table, evaluate the first time-related partition against the first retention period; in response to determining that the first time-related partition is out-of-retention, create a retention event specifying the first time-related partition and the retention action; and store the retention event in a retention events database.

Example 17 provides the one or more non-transitory computer-readable media of example 16, where evaluating the first time-related partition against the first retention period includes determining a time based on one or more time-related partition values of the first time-related partition; and evaluating the time against a current time.

Example 18 provides the one or more non-transitory computer-readable media of example 16 or 17, where the instructions further cause the one or more processors to: parse the metastore table to extract a second table property specifying a custom date partition key to which the retention policy applies.

Example 19 provides the one or more non-transitory computer-readable media of example 18, where the instructions further cause the one or more processors to: parse the metastore table to extract a third table property specifying a custom date format used by the custom date partition key.

Example 20 provides the one or more non-transitory computer-readable media of any one of examples 16-19, where the retention action is an archive action. <u> </u>

Example 21 provides the one or more non-transitory computer-readable media of any one of examples 16-19, where the retention action is a delete action.

Example 22 provides the one or more non-transitory computer-readable media of any one of examples 16-21, where the first retention period specifies a number of days.

Example 23 provides the one or more non-transitory computer-readable media of any one of examples 16-22, where the first table property includes a unique identifier identifying the retention policy in a configuration file that associates different unique identifiers to different retention policies.

Example 24 provides the one or more non-transitory computer-readable media of any one of examples 16-23, where the retention event is consumable by a consumer and causes the consumer to perform the retention action on the first time-related partition.

Example 25 provides the one or more non-transitory computer-readable media of any one of examples 16-24, where creating the retention event is performed in response to determining that no active restore request is present for the first time-related partition.

Example 26 provides the one or more non-transitory computer-readable media of any one of examples 16-25, where the instructions further cause the one or more processors to: parse the metastore table to extract a fourth table property specifying a second retention period overriding the first retention period; and in response to determining that the second retention period applies to the first time-related partition of the metastore table, evaluate the first time-related partition against the second retention period.

Example 27 provides the one or more non-transitory computer-readable media of any one of examples 16-26, where the instructions further cause the one or more processors to: parse the metastore table to extract a fifth table property specifying a filter criterion and a third retention period overriding the first retention period; and in response to determining that the third retention period applies to the first time-related partition of the metastore table based on the first time-related partition meeting the filter criterion, evaluate the first time-related partition against the third retention period.

Example 28 provides the one or more non-transitory computer-readable media of example 27, where the filter criterion specifies a partition key and a partition value.

Example 29 provides the one or more non-transitory computer-readable media of example 27, where the filter criterion specifies a path prefix.

Example 30 provides the one or more non-transitory computer-readable media of any one of examples 16-29, where the instructions further cause the one or more processors to: determine an applicable retention period for the first time-related partition based on an order of precedence and one or more table properties of the metastore table, the order of precedence including, in the following order, a path prefix retention period override or a partition-level retention period override, a table-level retention period override, and a table-level retention period.

Example 31 provides a computer-implemented system, including one or more processors, and one or more non-transitory computer-readable media storing instructions that, when executed by the one or more processors, cause the one or more processors to: parse a metastore table to extract a first table property, the metastore table having one or more time-related partitions, the first table property corresponding to a retention policy having a retention action and a first retention period; in response to determining that the first retention period applies to a first time-related partition of the metastore table, evaluate the first time-related partition against the first retention period; in response to determining that the first time-related partition is out-of-retention, create a retention event specifying the first time-related partition and the retention action; and store the retention event in a retention events database.

Example 32 provides the computer-implemented system of example 31, where evaluating the first time-related partition against the first retention period includes determining a time based on one or more time-related partition values of the first time-related partition; and evaluating the time against a current time.

Example 33 provides the computer-implemented system of example 31 or 32, where the instructions further cause the one or more processors to: parse the metastore table to extract a second table property specifying a custom date partition key to which the retention policy applies.

Example 34 provides the computer-implemented system of example 33, where the instructions further cause the one or more processors to: parse the metastore table to extract a third table property specifying a custom date format used by the custom date partition key.

Example 35 provides the computer-implemented system of any one of examples 31-34, where the retention action is an archive action. <u> </u>

Example 36 provides the computer-implemented system of any one of examples 31-34, where the retention action is a delete action.

Example 37 provides the computer-implemented system of any one of examples 31-36, where the first retention period specifies a number of days.

Example 38 provides the computer-implemented system of any one of examples 31-37, where the first table property includes a unique identifier identifying the retention policy in a configuration file that associates different unique identifiers to different retention policies.

Example 39 provides the computer-implemented system of any one of examples 31-38, where the retention event is consumable by a consumer and causes the consumer to perform the retention action on the first time-related partition.

Example 40 provides the computer-implemented system of any one of examples 31-39, where creating the retention event is performed in response to determining that no active restore request is present for the first time-related partition.

Example 41 provides the computer-implemented system of any one of examples 31-40, where the instructions further cause the one or more processors to: parse the metastore table to extract a fourth table property specifying a second retention period overriding the first retention period; and in response to determining that the second retention period applies to the first time-related partition of the metastore table, evaluate the first time-related partition against the second retention period.

Example 42 provides the computer-implemented system of any one of examples 31-41, where the instructions further cause the one or more processors to: parse the metastore table to extract a fifth table property specifying a filter criterion and a third retention period overriding the first retention period; and in response to determining that the third retention period applies to the first time-related partition of the metastore table based on the first time-related partition meeting the filter criterion, evaluate the first time-related partition against the third retention period.

Example 43 provides the computer-implemented system of example 42, where the filter criterion specifies a partition key and a partition value.

Example 44 provides the computer-implemented system of example 42, where the filter criterion specifies a path prefix.

Example 45 provides the computer-implemented system of any one of examples 31-44, where the instructions further cause the one or more processors to: determine an applicable retention period for the first time-related partition based on an order of precedence and one or more table properties of the metastore table, the order of precedence including, in the following order, a path prefix retention period override or a partition-level retention period override, a table-level retention period override, and a table-level retention period.

Example A provides an apparatus comprising means to perform any one of the methods of examples 1-15.

Example B provides a computer program product comprising instructions, that when executed by one or more processors, cause the one or more processors to perform any one of the methods of examples 1-15.

Example C provides a producer as described and/or illustrated in FIG. 3.

Example D provides one or more consumers as described and/or illustrated in FIG. 3.

Example E provides a producer and one or more consumers as described and/or illustrated in FIG. 3.

Example F provides a producer as described and/or illustrated in FIG. 9.

Example G provides one or more consumers as described and/or illustrated in FIG. 9.

Example H provides a producer and one or more consumers as described and/or illustrated in FIG. 9.

Example I provides a system having one or more components as described and illustrated in FIG. 3.

Example J provides a system having one or more components as described and illustrated in FIG. 9.

Example K provides a retention event as described and/or illustrated herein.

Example L provides a restore request as described and/or illustrated herein.

Example M provides a method described and/or illustrated in any one of FIGS. 6-9.

VARIATIONS AND OTHER NOTES

Although the operations of the example methods shown in and described with reference to the FIGS. are illustrated as occurring once each and in a particular order, it will be recognized that the operations may be performed in any suitable order and repeated as desired. Additionally, one or more operations may be performed in parallel. Furthermore, the operations illustrated in the FIGS. may be combined or may include more or fewer details than described.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

For purposes of explanation, specific numbers, materials and configurations are set forth in order to provide a thorough understanding of the illustrative implementations. However, it will be apparent to one skilled in the art that the present disclosure may be practiced without the specific details and/or that the present disclosure may be practiced with only some of the described aspects. In other instances, well known features are omitted or simplified in order not to obscure the illustrative implementations.

Further, references are made to the accompanying drawings that form a part hereof, and in which are shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the disclosed subject matter. However, the order of description should not be construed as to imply that these operations are necessarily order dependent. In particular, these operations may not be performed in the order of presentation. Operations described may be performed in a different order from the described embodiment. Various additional operations may be performed or described operations may be omitted in additional embodiments.

For the purposes of the present disclosure, the phrase "A or B" or the phrase "A and/or B" means (A), (B), or (A and B). For the purposes of the present disclosure, the phrase "A, B, or C" or the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for ease of discussion, and do not imply a desired or required orientation. The accompanying drawings are not necessarily drawn to scale. Unless otherwise specified, the use of the ordinal adjectives "first," "second," and "third," etc., to describe a common object, merely indicates that different instances of like objects are being referred to and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

The terms "substantially," "close," "approximately," "near," and "about," generally refer to being within +/−20% of a target value as described herein or as known in the art. Similarly, terms indicating orientation of various elements, e.g., "coplanar," "perpendicular," "orthogonal," "parallel," or any other angle between the elements, generally refer to being within +/−5-20% of a target value as described herein or as known in the art.

In addition, the terms "comprise," "comprising," "include," "including," "have," "having" or any other variation thereof, are intended to cover a non-exclusive inclusion. For example, a method, process, or device, that comprises a list of elements is not necessarily limited to only those elements but may include other elements not expressly listed or inherent to such method, process, or device. Also, the term "or" refers to an inclusive "or" and not to an exclusive "or."

The systems, methods and devices of this disclosure each have several innovative aspects, no single one of which is solely responsible for all desirable attributes disclosed herein. Details of one or more implementations of the subject matter described in this specification are set forth in the description and the accompanying drawings.

The invention claimed is:

1. A method for data retention, comprising:

parsing, by a partition semantics system, a metastore table to extract a first table property, the metastore table having one or more time-related partitions, the first table property corresponding to a retention policy having a retention action and a first retention period;

in response to determining that the first retention period applies to a first time-related partition of the metastore table, evaluating, by the partition semantics system, the first time-related partition against the first retention period;

in response to determining that the first time-related partition is out-of-retention, creating, by the partition semantics system, a retention event specifying the first time-related partition and the retention action;

storing, by the partition semantics system, the retention event in a retention events database; and consuming, by an event consumption system, the retention event by performing operations in the following order:

(1) serializing partition metadata of the first time-related partition as a string and copying the string to an archive storage bucket;

(2) creating, by the event consumption system, a storage transfer job to copy data of the first time-related partition from a source storage to a further archive storage bucket, wherein the storage transfer job deletes the data of the first time-related partition at the further archive storage bucket when the data of the first time-related partition at the further archive storage bucket differs from the source storage or when the data of the first time-related partition only exists at the further archive storage bucket;

(3) dropping, by the event consumption system, the first time-related partition from the metastore table; and (4) deleting, by the event consumption system, the first time-related partition at the source storage.

2. The method of claim 1, wherein evaluating, by the partition semantics system, the first time-related partition against the first retention period comprises:

determining, by the partition semantics system, a time based on one or more time-related partition values of the first time-related partition; and evaluating, by the partition semantics system, the time against a current time.

3. The method of claim 1, further comprising:

parsing, by the partition semantics system, the metastore table to extract a second table property specifying a custom date partition key to which the retention policy applies.

4. The method of claim 3, further comprising:

parsing, by the partition semantics system, the metastore table to extract a third table property specifying a custom date format used by the custom date partition key.

5. The method of claim 1, wherein the retention action is an archive action.

6. The method of claim 1, wherein the retention action is a delete action.

7. The method of claim 1, wherein the first retention period specifies a number of days.

8. The method of claim 1, wherein the first table property comprises a unique identifier identifying the retention policy in a configuration file that associates different unique identifiers to different retention policies.

9. The method of claim 1, wherein the retention event is consumable by a consumer and causes the consumer to perform the retention action on the first time-related partition.

10. The method of claim 1, wherein:

creating the retention event is performed in response to determining that no active restore request is present in a restore requests database for the first time-related partition; and a restore request in the restore requests database requests archived data to be restored and is considered active when the restore request has not yet expired.

11. The method of claim 1, further comprising:

parsing, by the partition semantics system, the metastore table to extract a fourth table property specifying a second retention period overriding the first retention period; and in response to determining that the second retention period applies to the first time-related partition of the metastore table, evaluating, by the partition semantics system, the first time-related partition against the second retention period.

12. The method of claim 1, further comprising:

parsing, by the partition semantics system, the metastore table to extract a fifth table property specifying a filter criterion and a third retention period overriding the first retention period; and in response to determining that the third retention period applies to the first time-related partition of the metastore table based on the first time-related partition meeting the filter criterion, evaluating, by the partition semantics system, the first time-related partition against the third retention period.

13. The method of claim 12, wherein the filter criterion specifies a partition key and a partition value.

14. The method of claim 12, wherein the filter criterion specifies a path prefix.

15. The method of claim 1, further comprising:

determining, by the partition semantics system, an applicable retention period for the first time-related partition based on an order of precedence and one or more table properties of the metastore table, the order of precedence including, in the following order, a path prefix retention period override or a partition-level retention period override, a table-level retention period override, and a table-level retention period.

16. One or more non-transitory computer-readable media storing instructions that, when executed by one or more processors, cause the one or more processors to:

parse a metastore table to extract a first table property, the metastore table having one or more time-related partitions, the first table property corresponding to a retention policy having a retention action and a first retention period;

in response to determining that the first retention period applies to a first time-related partition of the metastore table, evaluate the first time-related partition against the first retention period;

in response to determining that the first time-related partition is out-of-retention, create a retention event specifying the first time-related partition and the retention action;

store the retention event in a retention events database; and consume the retention event by performing operations in the following order:

(1) serializing partition metadata of the first time-related partition as a string and copying the string to an archive storage bucket;

(2) creating a storage transfer job to copy data of the first time-related partition from a source storage to a further archive storage bucket, wherein the storage transfer job deletes the data of the first time-related partition at the further archive storage bucket when the data of the first time-related partition at the further archive storage bucket differs from the source storage or when the data of the first time-related partition only exists at the further archive storage bucket;

(3) dropping the first time-related partition from the metastore table; and (4) deleting the first time-related partition at the source storage.

17. The one or more non-transitory computer-readable media of claim 16, wherein evaluating the first time-related partition against the first retention period comprises:

determining a time based on one or more time-related partition values of the first time-related partition; and evaluating the time against a current time.

18. The one or more non-transitory computer-readable media of claim 16, wherein the instructions further cause the one or more processors to:

parse the metastore table to extract a second table property specifying a custom date partition key to which the retention policy applies.

19. A computer-implemented system, comprising:

one or more processors, and one or more non-transitory computer-readable media storing instructions that, when executed by the one or more processors, cause the one or more processors to:

parse a metastore table to extract a first table property, the metastore table having one or more time-related partitions, the first table property corresponding to a retention policy having a retention action and a first retention period;

in response to determining that the first retention period applies to a first time-related partition of the metastore table, evaluate the first time-related partition against the first retention period;

in response to determining that the first time-related partition is out-of-retention, create a retention event specifying the first time-related partition and the retention action;

store the retention event in a retention events database; and consume the retention event by performing operations in the following order:

(1) serializing partition metadata of the first time-related partition as a string and copying the string to an archive storage bucket;

(2) creating a storage transfer job to copy data of the first time-related partition from a source storage to a further archive storage bucket, wherein the storage transfer job deletes the data of the first time-related partition at the further archive storage bucket when the data of the first time-related partition at the further archive storage bucket differs from the source storage or when the data of the first time-related partition only exists at the further archive storage bucket;

(3) dropping the first time-related partition from the metastore table; and (4) deleting the first time-related partition at the source storage.

20. The computer-implemented system of claim 19, wherein the first retention period specifies a number of days.

* * * * *